(12) United States Patent
Viswanathan et al.

(10) Patent No.: US 9,596,440 B2
(45) Date of Patent: Mar. 14, 2017

(54) SCANNING LASER PLANARITY DETECTION

(71) Applicant: Microvision, Inc., Redmond, WA (US)

(72) Inventors: P. Selvan Viswanathan, Bellevue, WA (US); Robert James Jackson, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 229 days.

(21) Appl. No.: 14/483,468

(22) Filed: Sep. 11, 2014

(65) Prior Publication Data

US 2016/0080709 A1 Mar. 17, 2016

(51) Int. Cl.
*G03B 21/20* (2006.01)
*H04N 9/31* (2006.01)
*G02B 26/10* (2006.01)
*G02B 27/10* (2006.01)

(52) U.S. Cl.
CPC ......... *H04N 9/3155* (2013.01); *G02B 26/101* (2013.01); *G02B 27/104* (2013.01); *H04N 9/3129* (2013.01); *H04N 9/3194* (2013.01); *G03B 21/2053* (2013.01); *H04N 9/3179* (2013.01)

(58) Field of Classification Search
CPC .... G03B 21/14; G03B 21/2053; G03B 21/26; H04N 9/3179; H04N 9/3194; H04N 9/3161; H04N 9/3129
USPC ...................................... 353/97, 88
See application file for complete search history.

(56) References Cited

U.S. PATENT DOCUMENTS

| 2004/0165154 A1* | 8/2004 | Kobori ................. G03B 21/26 353/69 |
| 2008/0151128 A1* | 6/2008 | Su ........................ G03B 21/00 348/744 |
| 2009/0147224 A1 | 6/2009 | Kurozuka et al. |
| 2010/0177929 A1* | 7/2010 | Kurtz ................ G06K 9/00228 382/103 |
| 2011/0102763 A1 | 5/2011 | Brown et al. |
| 2013/0003026 A1 | 1/2013 | Rothaar |

FOREIGN PATENT DOCUMENTS

JP 2008-268645 11/2008

OTHER PUBLICATIONS

Microvision, Inc., , "International Search Report and Written Opinion", PCT/US2015/047701 ISR and Written Opinion.

* cited by examiner

*Primary Examiner* — William C Dowling
*Assistant Examiner* — Ryan Howard
(74) *Attorney, Agent, or Firm* — Kevin D. Wills

(57) ABSTRACT

A scanning laser projector includes a proximity sensor and a planarity detector. When the proximity sensor detects an object closer than a proximity threshold, laser power is turned down. The scanning laser projector can measure distance at a plurality of projection points in the projector's field of view. If the projection points lie substantially in a plane, laser power may be turned back up.

26 Claims, 15 Drawing Sheets

SCANNING LASER PLANARITY DETECTION

FIELD

The present invention relates generally to distance measurement systems, and more specifically to scanning laser based distance measurement systems.

BACKGROUND

In scanning laser projection systems, laser power may be decreased when an object is detected in the projector's field of view. A proximity sensor may be used for this purpose. Output power may be decreased as a function of reducing distance between an object or surface of obstruction or interference and the projector or light source. This could be done to stay within a certain laser system classification or class rating.

A user may desire to project onto a surface that is closer than the threshold distance. For example, a user may intentionally move a projector very close to a projection surface to compensate for ambient lighting conditions. However, as the distance between the projector and the projection surface is reduced to below a threshold distance, the laser power will be reduced, thereby thwarting the user's attempt to make the image brighter.

DESCRIPTION OF EMBODIMENTS

Figure 1:
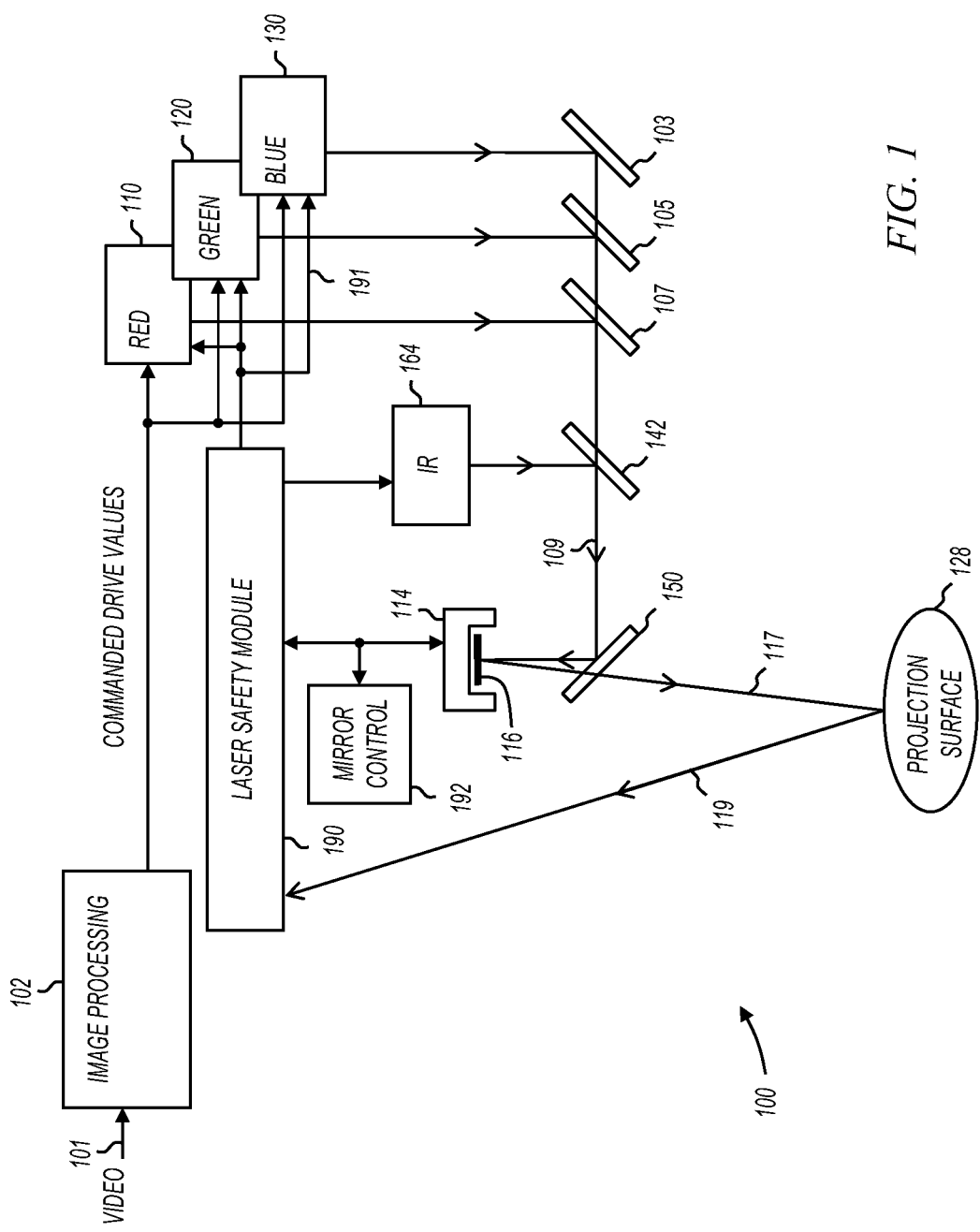
FIG. 1 shows a scanning laser projector in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning laser projector in accordance with various embodiments of the present invention. Scanning laser projector 100 includes image processing component 102, red laser module 110, green laser module 120, blue laser module 130, and infrared laser module 164. Light from the laser modules is combined with dichroics 103, 105, 107, and 142. Scanning laser projector 100 also includes fold mirror 150, and scanning platform 114 with scanning mirror 116.

In operation, image processing component 102 processes video content at 101 using two dimensional interpolation algorithms to determine the appropriate spatial image content for each scan position at which an output pixel is to be displayed. This content is then mapped to a commanded current for each of the red, green, and blue laser sources such that the output intensity from the lasers is consistent with the input image content. In some embodiments, this process occurs at output pixel rates in excess of 150 MHz.

The laser beams are then directed onto an ultra-high speed gimbal mounted 2 dimensional bi-axial laser scanning mirror 116. In some embodiments, this bi-axial scanning mirror is fabricated from silicon using MEMS processes. The vertical axis of rotation is operated quasi-statically and creates a vertical sawtooth raster trajectory. The horizontal axis is operated on a resonant vibrational mode of the scanning mirror. In some embodiments, the MEMS device uses electromagnetic actuation, achieved using a miniature assembly containing the MEMS die, small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

A mirror control circuit 192 provides one or more drive signal(s) to control the angular motion of scanning mirror 116 to cause output beam 117 to generate a raster scan 126 (shown in FIG. 2) on a projection surface 128. In operation, the laser light sources produce light pulses for each output pixel and scanning mirror 116 reflects the light pulses as beam 117 traverses the raster pattern.

Control circuit 192 may be implemented in hardware, a programmable processor, or in any combination. For example, in some embodiments, control circuit 192 is implemented in an application specific integrated circuit (ASIC). Further, in some embodiments, some of the faster data path control is performed in an ASIC and overall control is provided by a software programmable microprocessor.

Scanning laser projector 100 also includes laser safety module 190. In operation, laser safety module 190 modifies laser output power based on one or more variables. For example, in some embodiments, laser safety module 190 includes a proximity sensor and reduces output laser power when the distance between the projector and projection surface 128 (or something in front of projection surface 128) is below a proximity threshold. Also in some embodiments, laser safety module 190 includes a planarity detector that is able to detect whether projection surface 128 is substantially planar. Laser safety module 190 may modify output laser power provided by any of laser modules 110, 120, 130, or 164 based on whether the projection surface is or is not substantially planar. In still further embodiments, laser safety module 190 may include a heat sensor to determine whether an animate object exists in the field of view of the projector.

In order to drive higher output power levels (increased brightness of projector) over what is prescribed for a certain projection distance at a certain laser system class rating, various embodiments of the present invention are capable of determining whether it is safe to turn laser power back up even if a proximity violation is present.

Figure 2:
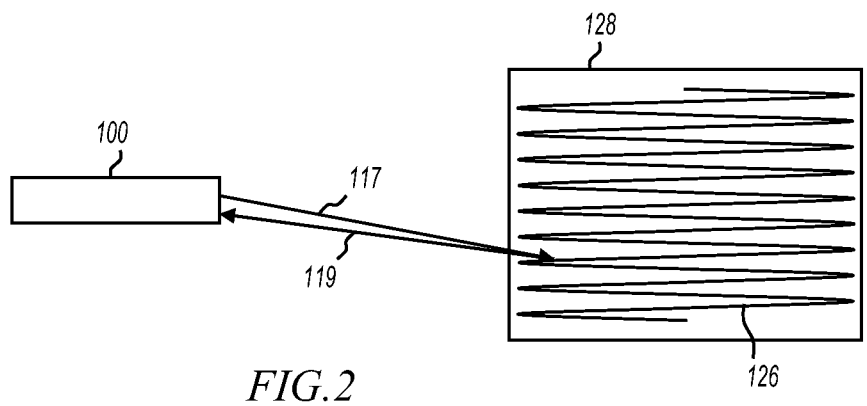
FIG. 2 shows a projector scanning a modulated laser beam in a raster pattern in accordance with various embodiments of the present invention.

FIG. 2 shows a projector scanning a modulated laser beam in a raster pattern in accordance with various embodiments of the present invention. Scanning laser projector 100 is shown scanning output beam 117 in a raster pattern across a field of view of the projector, resulting in raster scan 126 on projection surface 128.

As used herein, the term "field of view" refers to the area reachable by output beam 117 when scanning. For example, any point in space that might be illuminated by output beam 117 is referred to as being within the field of view of projector 100.

In some embodiments, raster scan 126 is formed by combining a sinusoidal component on the horizontal axis and a sawtooth component on the vertical axis. In these embodiments, output beam 117 sweeps back and forth left-to-right in a sinusoidal pattern, and sweeps vertically (top-to-bottom) in a sawtooth pattern with the display blanked during flyback (bottom-to-top). FIG. 2 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern.

Figure 3:
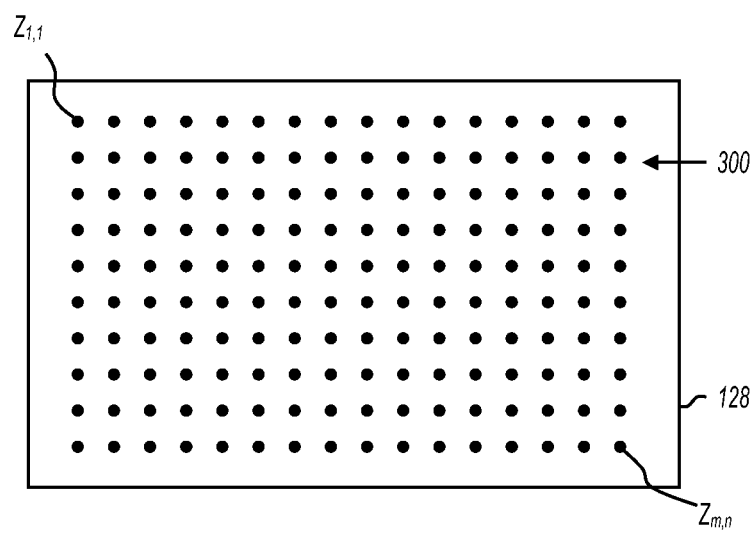
FIG. 3 shows projection points on a projection surface in accordance with various embodiments of the present invention.

FIG. 3 shows projection points on a projection surface in accordance with various embodiments of the present invention. As used herein, the term "projection points" refers to points in space illuminated by the raster scanning laser beam. For example, FIG. 3 shows an array of projection points 300 on a planar projection surface 128.

Various embodiments of the present invention measure the distance between projector 100 and projection points within the field of view of the projector. For example, a proximity sensor that includes a time-of-flight (TOF) measurement system may be included to measure the round trip transit time of laser light pulses, thereby measuring the distances to the various projection points.

FIG. 3 shows (m×n) projection points arranged in an array pattern, although this is not a limitation of the present invention. Distances may be measured at any number of projection points, and the points may not be arranged in an array as shown. For example, in some embodiments, the projection points are sparsely populated in one or both dimensions.

Time-of-flight proximity sensing produces a three dimensional data set when used in scanned beam projection. For example, the three dimensional data shown in FIG. 3 includes a distance (Z) at a location (m,n). The indices m and n may correspond to mirror angles or to rectangular coordinates in free space. Likewise, the Z term may represent a radius value in polar coordinates or may represent a third value in a rectangular coordinate system. One skilled in the art will understand how to freely convert between coordinate systems.

As can be seen in FIG. 3, a TOF measurement can be triggered anywhere in the raster scan, and a data-array that includes any number of measurement points can be constructed over the course of the frame that represents a three dimensional dataset. The resolution of the TOF can be sparse (as pictured) or much higher density to achieve a very high resolution of measurement. Oversampling with slightly offset measurement points across multiple frames can yield even higher resolutions.

The three dimensional data set $(Z_{1,1} \ldots Z_{m,n})$ can be used to infer dimensions or shapes of the projection surface and or any objects in the field of view in front of the projection surface. For example, in the embodiments represented by FIG. 3, the projection points lie in a plane.

In some use cases for a projection system, the user will point the projector onto a planar surface such as a wall. However, if the wall is too close, the system may reduce power or turn off because of a proximity violation detected by the TOF measurement system. To preclude this, additional processing of the captured 3D data array can be used to distinguish the object in front of the projector. In this case, special mathematical processing is performed to identify the 3D data as a planar surface. This allows the system to distinguish between a human head or body and a planar surface. If this information is known, the projector can return to its normal output power and project at full power while the projection surface is within range of the TOF proximity system and a proximity violation is still present.

Figure 4:
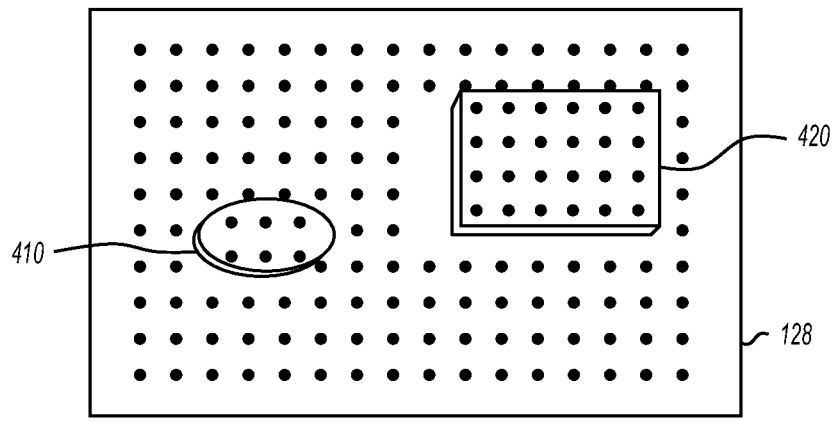
FIG. 4 shows projection points on objects in front of a projection surface in accordance with various embodiments of the present invention.

FIG. 4 shows projection points on objects in front of a projection surface in accordance with various embodiments of the present invention. Objects 410 and 420 are shown in front of projection surface 128. Objects 410 and 420 may be any type of object that can appear between the projector and the projection surface. For example, they may be objects on a table that is between the projector and a wall, or they may be a human hand and head or a person walking through the field of view in front of the projector.

As the output beam scans across the objects, distances to projection points are measured. In one instance, if the distances are less than a proximity threshold then the laser projector may immediately reduce output power to satisfy a certain laser system class rating. As described further below, the projector may then determine whether all projection points lie substantially in a plane. In the example of FIG. 4, the projection points do not all lie substantially in a plane, so the laser power will not be restored based solely on the planarity determination.

In further embodiments, the projector may measure heat in the field of view in an effort to determine whether either of objects 410 or 420 is an animate object, as the focus of laser system classification is the effect on human skin, tissue and optic nerve endings. If they are determined to be animate, then laser power will remain reduced, whereas if they are determined to be inanimate, then laser power may be restored to higher levels.

Figure 5:
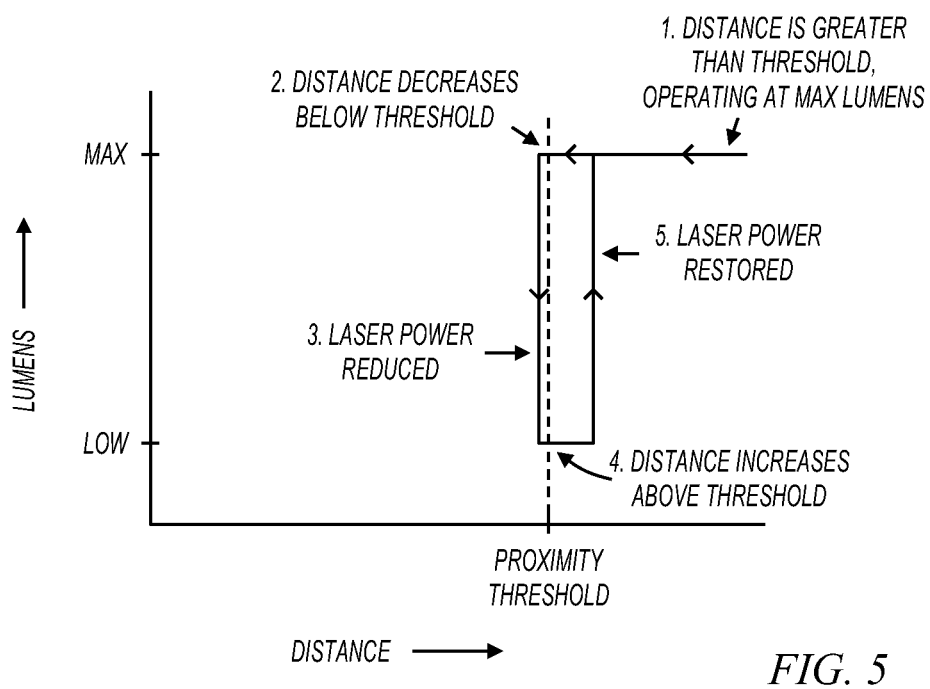
FIGS. 5 and 6 show changes in laser power that occur during operation of a scanning laser projector in accordance with various embodiments of the present invention.

FIG. 5 shows changes in laser power that occur during operation of a scanning laser projector in accordance with various embodiments of the present invention. The plot in FIG. 5 shows output lumens on the vertical axis as a function of distance on the horizontal axis. The laser power changes shown in FIG. 5 may occur when the projector is moved close to a projection surface and then back away from the projection surface. The laser power changes shown in FIG. 5 may also occur when an obstruction is placed in the field of view and then subsequently removed from the field of view.

Starting at (1), the measured distance at all projection points is greater than a proximity threshold, and the projector is operating at maximum output lumens permissible at a certain laser system class rating. At (2), the proximity sensor has determined that at least one projection point is closer than the proximity threshold, and the laser power is reduced at (3) to satisfy a specific laser system class rating in the field of view of the projector. At (4), the proximity sensor determines that all projection points are once again farther away than the proximity threshold, so laser power can be increased to max power again at (5).

The operations shown in FIG. 5 are an example of hysteresis over time. Laser power is turned down when the proximity threshold is violated, and then after a period of time, the laser power can be restored if the proximity violation is removed.

Figure 6:
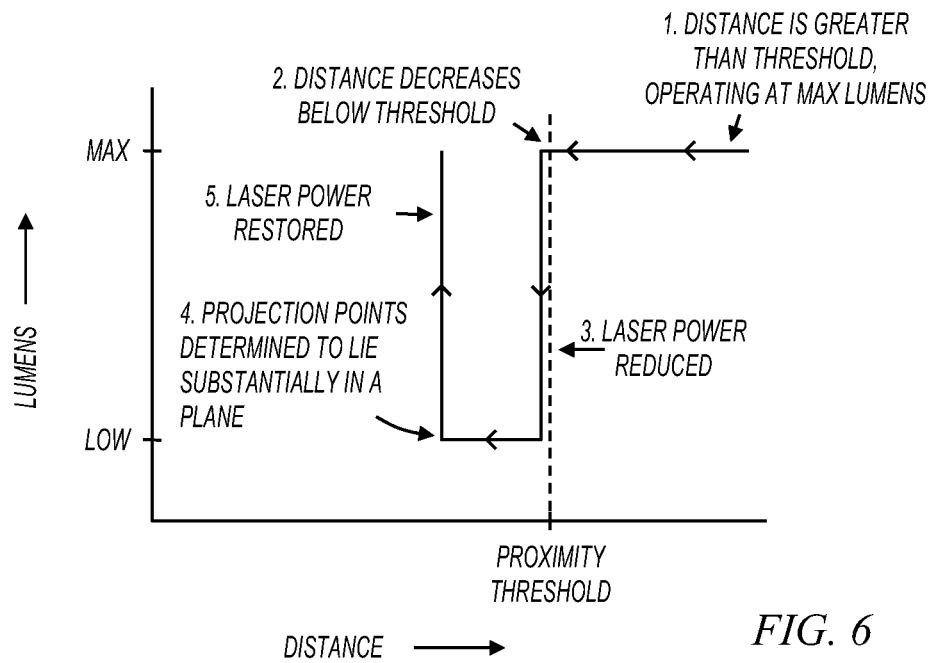

FIG. 6 shows changes in laser power that occur during operation of a scanning laser projector in accordance with various embodiments of the present invention. The operation of FIG. 6 is similar to that of FIG. 5 except that a surface or projection plane geometry determination may be performed in addition to time domain hysteresis. For example, if the projection points are determined to lie substantially in plane, the laser power may be restored to a higher value even if a proximity violation is still present.

Starting at (1), the measured distance at all projection points is greater than a proximity threshold, and the projector is operating at maximum output lumens permissible at a certain laser system class rating. At (2), the proximity sensor has determined that at least one projection point is closer than the proximity threshold, and the laser power is reduced at (3). At (4), the projector determines that the projection points lie substantially in a plane. Laser power can be increased to max power again at (5) as a result of the planarity determination.

The operation may proceed from (5) by reducing power again if the projector determines that the projection points no longer lie substantially in a plane, or the process may start again at (1) if the projector determines that the measured distance at all projection points is once again greater than the proximity threshold.

FIG. 6 demonstrates operations that will occur when a user intends to get close to a projection plane to either control the size of the projected image or to increase the perceived brightness of the image in the presence of high ambient light. In this event, once a proximity violation was detected, the laser power was turned down. However, to satisfy the user's intent, the laser power turned back on after the planarity determination even with the proximity violation still present.

Figure 7:
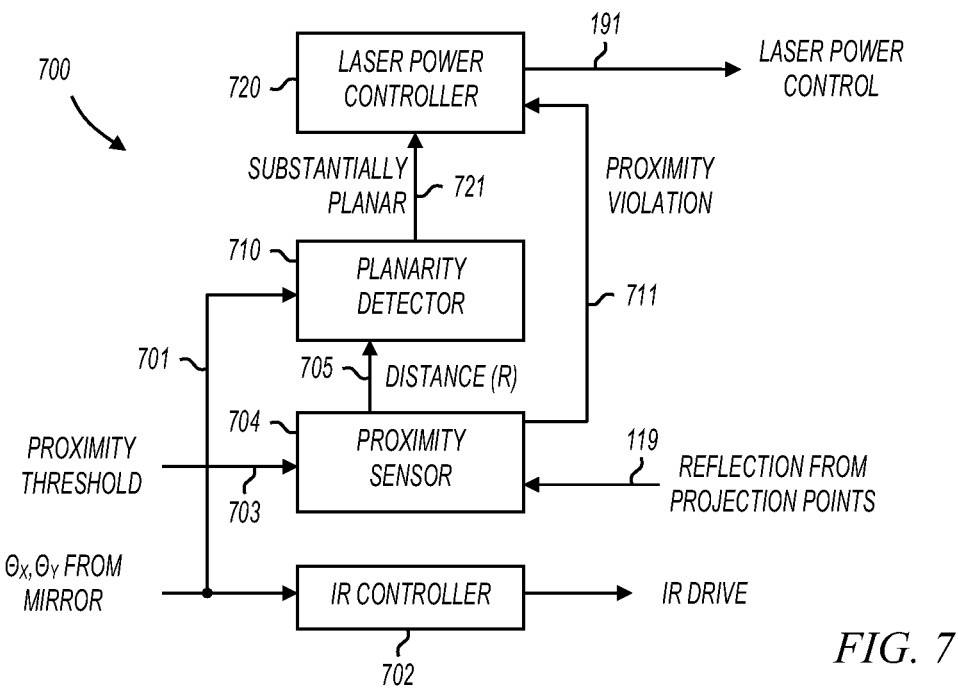
FIG. 7 shows a laser safety module in accordance with various embodiments of the present invention.

FIG. 7 shows a laser safety module in accordance with various embodiments of the present invention. Laser safety module 700 is an example implementation of laser safety module 190 (FIG. 1). Laser safety module 700 includes proximity sensor 704, planarity detector 710, laser power controller 720, and IR controller 702.

Proximity sensor 704 receives reflections from the projection points and measures the distance between the projection points and the scanning laser projector. In some embodiments, proximity sensor 704 measures distance by measuring the time-of-flight (TOF) of light pulses that are received at 119. For example, proximity sensor may include a TOF distance measurement system as described in U.S. Patent Application Publication 2013/0107000 A1.

In some embodiments, proximity sensor 704 includes a photodetector (not shown) and time-of-flight (TOF) distance measurement circuits to measure the distance. The photodetector may detect any wavelength of light. For example, when the photodetector detects infrared light, then distance measurements may be performed using the infrared light produced by IR light source 164 (FIG. 1). Also for example, when the photodetector detects visible light, then distance measurements may be performed using any of the visible light sources 110, 120, 130 (FIG. 1). The wavelength of light used for distance measurement is not a limitation of the present invention. Any wavelength, visible or nonvisible, may be used without departing from the scope of the present invention.

In operation, proximity sensor 704 receives reflections from the projection points and measures a distance as described above. The distance (R) is provided to planarity detector 710 on node 705. Proximity sensor 704 also receives a proximity threshold value on 703. In some embodiments, the proximity threshold value corresponds to an operating distance to satisfy a specific laser system class rating. For example, when the distance between the proximity sensor and all of the projection points is greater than the proximity threshold, operation at laser powers permissible in that class rating is allowed. Also for example, when the distance between the proximity sensor and any of the projection points is less than the proximity threshold, operation at higher laser powers may be unacceptable because with the reduced range the laser system class rating would be violated.

The proximity threshold value may be a digital value stored in a memory within the scanning laser projector, and may or may not be modifiable. For example, in some embodiments, the proximity threshold value may be programmed into the scanning laser projector at the time of manufacture, and may only be modified by the manufacturer. Also for example, in other embodiments, the proximity threshold value may be a static value that is hard coded within the proximity sensor by the system designer. In these embodiments, not even the manufacturer can modify the proximity threshold value. In still further embodiments, the proximity threshold value is a function of the current brightness of the scanning laser projector, and it varies as the user changes the brightness.

Planarity detector 710 receives the distance values from proximity sensor 704, and also receives mirror angle information on node 701. Using this information, planarity detector 710 generates an array of data that represents the locations of projection points in three-dimensional space as described above with reference to FIG. 3. Planarity detector 710 interprets the data and determines whether the projection points lie substantially in a plane.

As used herein, the phrase "lie substantially in a plane" refers to projection points in three-dimensional space that are planar within a specified tolerance value. The tolerance value may be specified in any manner. For example, in some embodiments, the tolerance value may be determined by measurement accuracy so as to prevent measurement errors from causing non-planarity determinations. In other embodiments, the tolerance value may be specified by a minimum expected dimension of a possible obstruction. For example, if an expected obstruction is a human head, then a tolerance value of a few centimeters may be used. In these embodiments, projection points that are within a few centimeters of being perfectly planar are considered to "lie substantially in a plane."

Various embodiments of the present invention detect planarity using different mechanisms. For example, some embodiments, the projection points are fit to a plane equation in 3D space. In other embodiments, gradient vectors are determined between adjacent points in the array to determine if any one projection point lies outside the tolerance value.

IR controller 702 drives the IR laser module 164 in response to the mirror angle information on node 701. In this manner, infrared light can be used to illuminate projection points in the field of view, and reflections at 119 can be used to measure proximity as described above. IR controller 702 may be implemented in any suitable manner. For example, some embodiments of IR controller 702 include analog electronics such as amplifiers and current drivers. Some embodiments also include digital electronics such as analog to digital converters, digital to analog converters, and microprocessors. The manner in which IR controller 702 is implemented is not a limitation of the present invention.

Laser power controller 720 modifiers the laser power output of scanning laser projector based on information received. For example, laser power controller 720 commands laser power to be turned down when a proximity violation is detected and communicated to laser power controller 720 at 711. Also for example, laser power controller 720 may command a change in laser power based on whether planarity detector 710 determines that the projection points lie substantially in a plane.

Laser power controller 720 may be implemented in any suitable manner. For example, in some embodiments, laser power controller 720 is implemented using a microprocessor that executes instructions stored in a memory device. Also in some embodiments, laser power controller 720 is included as part of an application specific circuit (ASIC) that includes both digital and analog circuitry. The laser power control signal at 191 may operate to turn up or down the laser power, or to shut off laser power. For example, the laser power control signal at 191 may disable a power supply that sources power to laser modules or may operate a shunt device that diverts some or all of the drive current that would otherwise drive laser diodes.

As described above with reference to FIG. 6, and as described further below with reference to later figures, laser power controller 720 may turn down laser power when a proximity violation is detected. Then, if the projection points are determined to lie substantially in a plane, the laser power may be turned back up. If, however, the projection points are not determined to lie substantially in a plane, then the laser power will remain at the lower level until the proximity violation is physically cleared.

Figure 8:
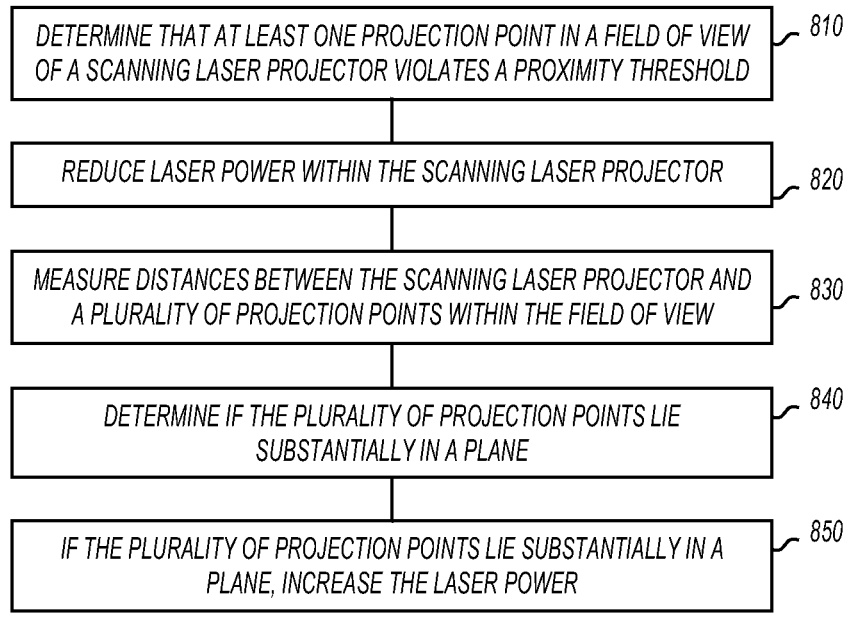
FIGS. 8 and 9 show flowcharts of methods in accordance with various embodiments of the present invention.

FIG. 8 shows a flow diagram of methods in accordance with various embodiments of the present invention. In some embodiments, method 800, or portions thereof, is performed by a scanning laser projector with planarity detection, embodiments of which are shown in previous figures. In other embodiments, method 800 is performed by a series of circuits or an electronic system. Method 800 is not limited by the particular type of apparatus performing the method. The various actions in method 800 may be performed in the order presented, or may be performed in a different order. Further, in some embodiments, some actions listed in FIG. 8 are omitted from method 800.

Method 800 is shown beginning with block 810. As shown at 810, a determination is made that at least one projection point in a field of view of a scanning laser projector violates a proximity threshold. In some embodiments, this corresponds to a proximity sensor (such as proximity sensor 704, FIG. 7) comparing distances between the projector and projection points to a proximity threshold, and determining that at least one of the projection points is too close to the projector. This is also shown at (2) in both FIGS. 5 and 6.

At 820, the laser power within the scanning laser projector is reduced in response to the proximity violation. In some embodiments, this corresponds to laser power controller 720 commanding a reduction in laser power from any or all of red laser module 110, green laser module 120, blue laser module 130, and optionally the color channel used for proximity measurements which could be the infrared laser module 164 (FIG. 1) as a result of receiving an indication of a proximity violation at 711. At 830, distances between the scanning laser projector and a plurality of projection points within the field of view are measured. In some embodiments, this is performed in parallel with the proximity violation detection at 810, and in other embodiments, this is performed after a proximity violation is detected. In some embodiments, the actions at 830 correspond to the operation of proximity sensor 704 as it receives reflections from projections points at 119.

At 840, a determination is made whether the plurality of projection points lie substantially in a plane. In some embodiments, this is performed by fitting the projection points to a best fit plane equation in 3D space. In other embodiments, this is performed by determining an average distance, and then comparing the distance to each projection point against the average. In still further embodiments, this is performed by determining an average gradient vector between adjacent projection points and then determining if any one projection point does not lie within the expected space.

At 850, the laser power is increased if the plurality of projection points lie substantially in a plane. In some embodiments, this corresponds to laser power controller 720 commanding the laser power to be restored as a result of receiving a planarity determination from planarity detector 710. This operation is also shown in FIG. 6 at (5) where that laser power is restored even though there is still a proximity violation.

Figure 9:
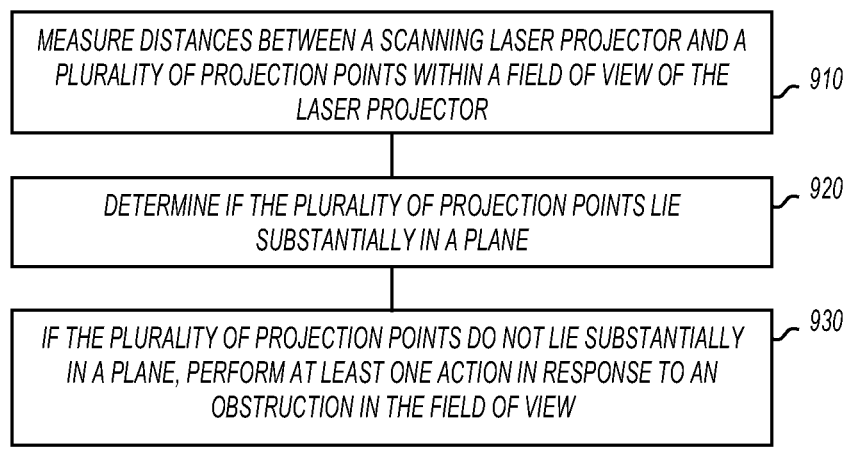

FIG. 9 shows a flow diagram of methods in accordance with various embodiments of the present invention. In some embodiments, method 900, or portions thereof, is performed by a scanning laser projector with planarity detection, embodiments of which are shown in previous figures. In other embodiments, method 900 is performed by a series of circuits or an electronic system. Method 900 is not limited by the particular type of apparatus performing the method. The various actions in method 900 may be performed in the order presented, or may be performed in a different order. Further, in some embodiments, some actions listed in FIG. 9 are omitted from method 900.

Method 900 is shown beginning with block 910. As shown at 910, distances between a scanning laser projector and a plurality of projection points within a field of view of the projector are measured. This corresponds to the operation of proximity sensor 704 (FIG. 7) measuring the round-trip transit time of reflections received at 119.

At 920, a determination is made whether the plurality of projection points lie substantially in a plane. In some embodiments, this is performed by fitting the projection points to a best fit plane equation in 3D space. In other embodiments, this is performed by determining an average distance, and then comparing the distance to each projection point against the average. In still further embodiments, this is performed by determining an average gradient vector between adjacent projection points and then determining if any one projection point does not lie within the expected space.

At 930, at least one action is performed to satisfy the requirements of the system or product instantiation with the obstruction in the field of view if the plurality of projection points do not lie substantially in a plane. In some embodiments, this corresponds to reducing laser power. In other embodiments, this corresponds to not increasing laser power. In still further embodiments, this corresponds to measuring heat in the field of view to determine if an obstruction exists that could be an animate object such as a human or animal. In still other embodiments, this might set a flag in a higher order or associated computing entity in the system to then cause it take action through a decision matrix.

Figure 10:
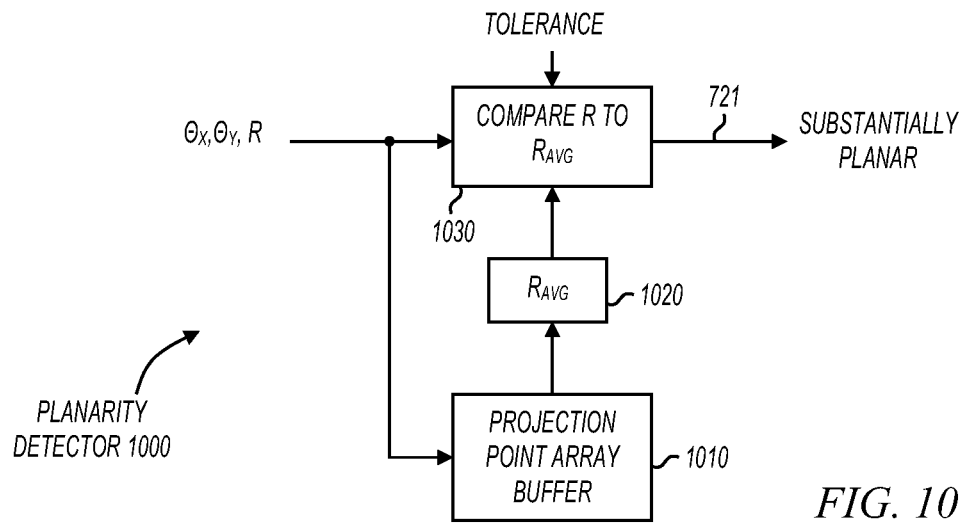
FIGS. 10 and 11 show planarity detectors in accordance with various embodiments of the present invention.
Figure 12:
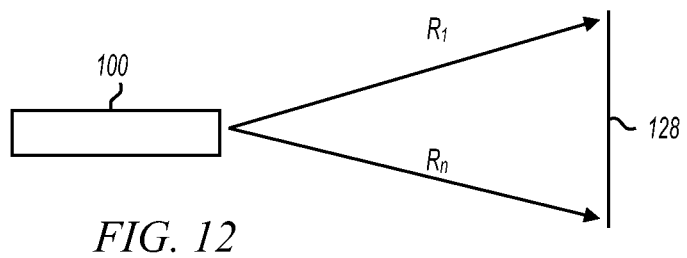
FIGS. 12-14 show various distance measurements made by a scanning laser projector in accordance with various embodiments of the present invention.

FIG. 10 shows a planarity detector in accordance with various embodiments of the present invention. Planarity detector 1000 may be used as planarity detector 710 in laser safety module 700 as described above. Planarity detector 1000 includes projection point array buffer 1010, averaging circuit 1020, and comparator 1030. In operation, each projection point is received by planarity detector 1000 as a point in 3D space represented by polar coordinates, $\Theta_X$, $\Theta_Y$, R, where $\Theta_X$, $\Theta_Y$ represent the mirror angle, and R represents the radius. The radius R is also shown in FIG. 12, where R is simply the measured distance between the scanning laser projector 100 and the projection points on the projection surface 128.

Referring now back to FIG. 10, projection point array buffer 1010 stores the data that represents the projection points in 3D space. In some embodiments, the data in projection points array buffer 1010 is replaced for each frame of projection points, and in other embodiments, the data in projection points array buffer 1010 is averaged over a number of frames to reduce noise. Projection point array buffer 1010 may be implemented in any suitable manner. For example, in some embodiments, projection points array buffer 1010 is implemented using a memory device such as a static random access memory (SRAM).

Averaging circuit 1020 averages the distance values (R) for all projection points. For example, referring to FIG. 12, all measured R values are summed and the result is divided by the number of projection points. FIG. 12 shows a side view of the projector and the projection surface, and also only shows R data in one dimension. In practice, R data will exist in two dimensions as the laser beam raster scans, and a two dimensional array of R values (see FIG. 3) will be collected.

Comparator 1030 compares the tolerance value to the difference between each R value and the average R value. If all R values differ from the average by less than the tolerance, the projection points are determined to lie substantially in a plane, and the substantially planar signal is asserted at 721.

In some embodiments, planarity detector 1000 stores complete polar coordinates in projection points array buffer 1010 as described above, and in other embodiments, planarity detector 1000 stores only R values for each projection point. Embodiments represented by FIG. 10 work well when the R values are not expected to vary much. For example, the R-averaging technique shown in FIG. 10 may work well if the projector is going to be normal to the projection surface, and the field of view is sufficiently narrow so that the R values are expected to vary within a narrow range (less than the tolerance value).

Figure 11:
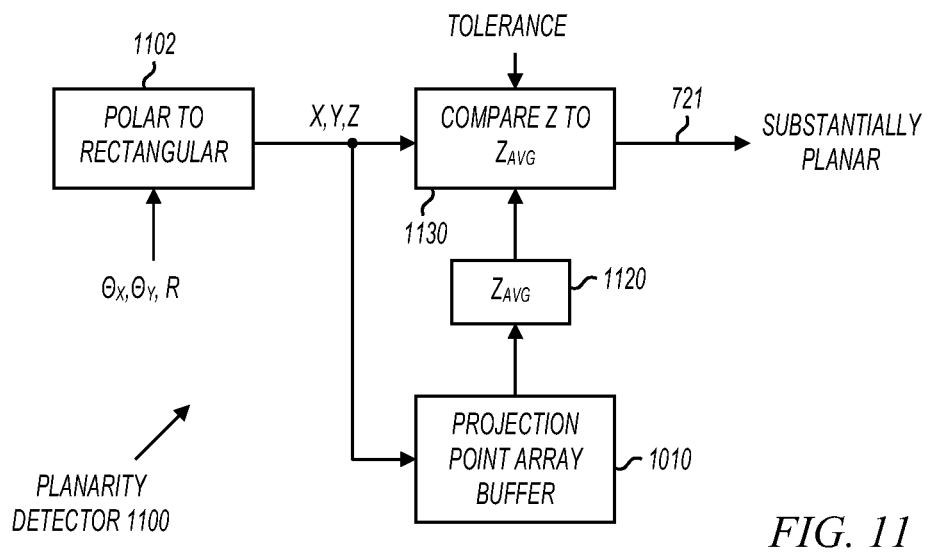

FIG. 11 shows a planarity detector in accordance with various embodiments of the present invention. Planarity detector 1100 may be used as planarity detector 710 in laser safety module 700 as described above. Planarity detector 1100 includes polar-to-rectangular conversion circuit 1102, projection point array buffer 1010, averaging circuit 1120, and comparator 1130. In operation, each projection point is received by planarity detector 1100 as a point in 3D space represented by polar coordinates $\Theta_X$, $\Theta_Y$, R, where $\Theta_X$, $\Theta_Y$ represent the mirror angle, and R represents the radius. Polar-to-rectangular conversion circuit 1102 receives the projection points in polar coordinates $\Theta_X$, $\Theta_Y$, R, and converts them to rectangular coordinates X,Y,Z. Polar-to-rectangular conversion circuit 1102 may be implemented in any suitable manner. For example, in some embodiments, polar-to-rectangular conversion circuit 1102 is implemented in digital hardware, and in other embodiments, polar-to-rectangular conversion circuit is implemented by a processor that executes instructions stored in a memory device.

Figure 13:
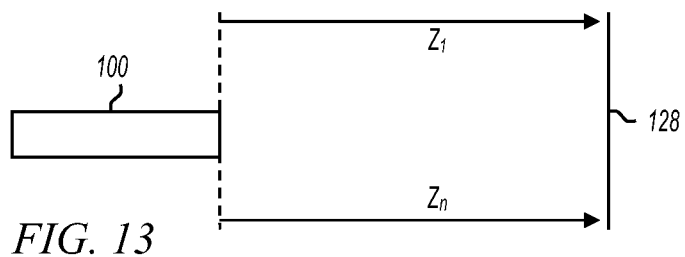
Figure 14:
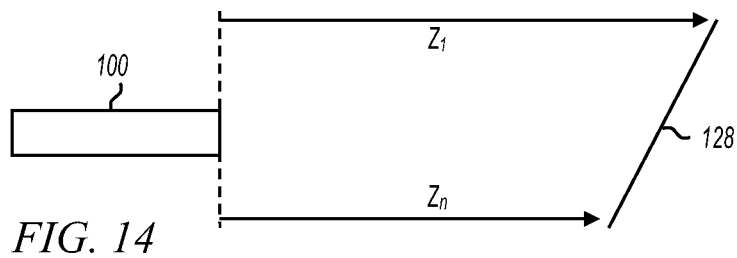

The Z coordinate is shown in FIGS. 13 and 14. The Z coordinate in the rectangular coordinate system differs from the R value in the polar coordinate system in that the Z coordinate represents the location of a point in a coordinate space that is independent of the projector, whereas the R value represents an absolute distance from the projector. Any of the disclosed embodiments may either include or omit a coordinate conversion circuit, and may use any coordinate system to represent projection points in space. FIG. 13 shows a projection surface that is substantially normal to the projector, and FIG. 14 shows a projection surface that is angled relative to the projector. Note that FIGS. 13 and 14 both collect projection point data that is substantially planar, even though the Z coordinate varies significantly in the example of FIG. 14.

Referring now back to FIG. 11, projection point array buffer 1010 stores the data that represents the projection points in 3D space. In some embodiments, the data in projection points array buffer 1010 is replaced for each frame of projection points, and in other embodiments, the data in projection points array buffer 1010 is averaged over a number of frames to reduce noise. Projection point array buffer 1010 may be implemented in any suitable manner. For example, in some embodiments, projection points array buffer 1010 is implemented using a memory device such as a static random access memory (SRAM).

Averaging circuit 1120 averages the Z coordinate values for all projection points. For example, referring to FIG. 13, all measured Z coordinate values are summed and the result is divided by the number of projection points. FIG. 13 shows a side view of the projector and the projection surface, and also only shows Z coordinate data in one dimension. In practice, Z coordinate data will exist in two dimensions as the laser beam raster scans, and a two dimensional array of Z coordinate values (see FIG. 3) will be collected.

Comparator 1130 compares the tolerance value to the difference between each Z coordinate value and the average Z coordinate value. If all Z coordinate values differ from the average by less than the tolerance, the projection points are determined to lie substantially in a plane, and the substantially planar signal is asserted at 721.

In some embodiments, planarity detector 1100 stores complete rectangular coordinates in projection points array buffer 1010 as described above, and in other embodiments, planarity detector 1100 stores only Z coordinate values for each projection point. Embodiments represented by FIG. 11 work well when the Z coordinate values are not expected to vary much. For example, the Z-averaging technique shown in FIG. 11 may work well if the projector is going to be normal to the projection surface so that the Z values are expected to vary within a narrow range (less than the tolerance value).

Distance averaging and Z coordinate averaging techniques described above with reference to FIGS. 10 and 11 work well when the projector is substantially normal to the projection surface as shown in FIGS. 12 and 13, but they fall short when the projection surface is not normal to the projection surface as shown in FIG. 14. Planarity detection embodiments suitable for non-normal projection surfaces are described below.

Figure 15:
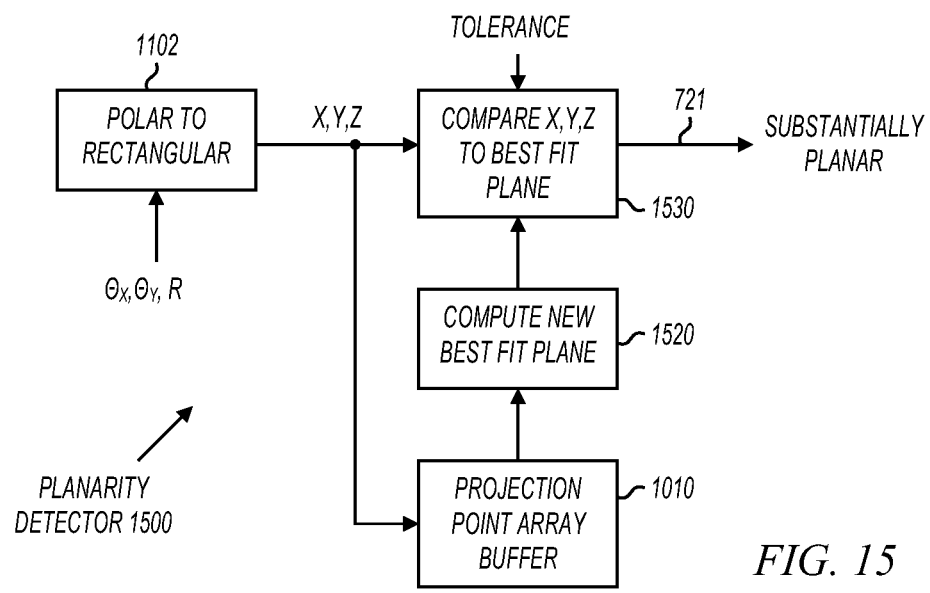
FIG. 15 shows a planarity detector in accordance with various embodiments of the present invention.

FIG. 15 shows a planarity detector in accordance with various embodiments of the present invention. Planarity detector 1500 may be used as planarity detector 710 in laser safety module 700 as described above. Planarity detector 1500 includes polar-to-rectangular conversion circuit 1102, projection point array buffer 1010, best fit plane computation circuit 1520, and comparator 1530. In operation, each projection point is received by planarity detector 1500 as a point in 3D space represented by polar coordinates $\Theta_X$, $\Theta_Y$, R, where $\Theta_X$, $\Theta_Y$ represent the mirror angle, and R represents the radius. Polar-to-rectangular conversion circuit 1102 receives the projection points in polar coordinates $\Theta_X$, $\Theta_Y$, R, and converts them to rectangular coordinates X,Y,Z. Polar-to-rectangular conversion circuit 1102 may be implemented in any suitable manner. For example, in some embodiments, polar-to-rectangular conversion circuit 1102 is implemented in digital hardware, and in other embodiments, polar-to-rectangular conversion circuit is implemented by a processor that executes instructions stored in a memory device.

Projection point array buffer 1010 stores the data that represents the projection points in 3D space. In some embodiments, the data in projection points array buffer 1010 is replaced for each frame of projection points, and in other embodiments, the data in projection points array buffer 1010 is averaged over a number of frames to reduce noise. Projection point array buffer 1010 may be implemented in any suitable manner. For example, in some embodiments, projection points array buffer 1010 is implemented using a memory device such as a static random access memory (SRAM).

Best fit plane computation circuit 1520 fits a plane equation to the projection points in projection points array buffer 1010 using a best fit criterion. For example, in some embodiments, a least squares error (LSE) algorithm is used to fit a plane equation to the projection points, and in other embodiments, an orthogonal distance regression plane is fit to the projection points, where the X and Y coordinates are considered fixed, and the Z distances to the plane are minimized. The various embodiments of the invention are not limited by the type of best-fit method used to fit a plane equation to the projection points.

In some embodiments, best fit plane computation circuit 1520 determines a best fit plane equation for each frame of projection points. In other embodiments, best fit plane equation computation circuit 1520 determines a best fit plane equation only after multiple frames of projection point data has been averaged to reduce noise.

Best fit plane computation circuit 1520 may be implemented in any suitable manner. For example, in some embodiments, best fit plane computation circuit 1520 is implemented in dedicated digital hardware controlled by one or more state machines. In these embodiments, the digital hardware and state machines may be included in an application specific integrated circuit (ASIC). In other embodiments, best fit plane computation circuit may be implemented with a processor that executes instructions stored in a memory.

Comparator 1530 compares the tolerance value to the difference between each Z coordinate value and the best fit plane equation determined by circuit 1520. If all Z coordinate values differ from the average by less than the tolerance, the projection points are determined to lie substantially in a plane, and the substantially planar signal is asserted at 721.

Best fit plane equation techniques described above with reference to FIG. 15 work well for all scenarios in which the projection surface is planar, regardless of the relative angles between the projector and the projection surface. For example, best fit plane equation techniques work well for the cases shown in FIGS. 12, 13, and 14.

Figure 16:
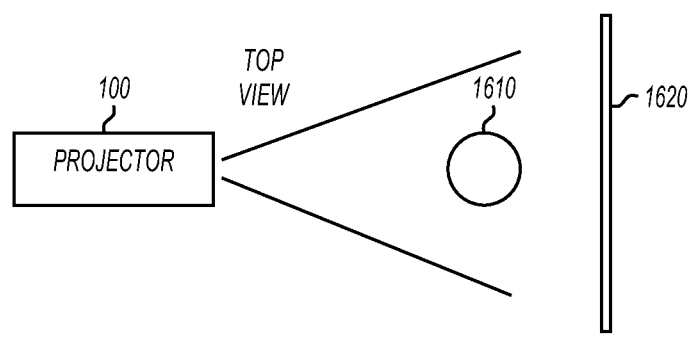
FIG. 16 shows a top view of a scanning laser projector with a contoured object in the projector's field of view in accordance with various embodiments of the present invention.

FIG. 16 shows a top view of a scanning laser projector with a contoured object in the projector's field of view in accordance with various embodiments of the present invention. Contoured object 1610 may a ball or a column in front of projection surface 1620. In some embodiments, object 1610 may be defined mathematically, such as a with an equation that represents a cylinder or a sphere.

Some embodiments of the present invention apply a more general shape fitting concept to non-planar surfaces that can be defined mathematically. For example, a cylinder such as a large support column in a building may serve as the projection surface. If the curvature of the column can be defined, the same projection point data array may be used to discern a uniform curvature that implies a valid projection surface.

Figure 17:
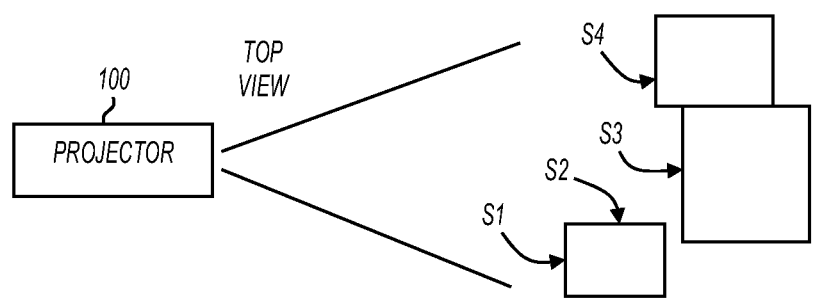
FIGS. 17 and 18 show top views of scanning laser projectors projecting onto complex projection surfaces in accordance with various embodiments of the present invention.
Figure 18:
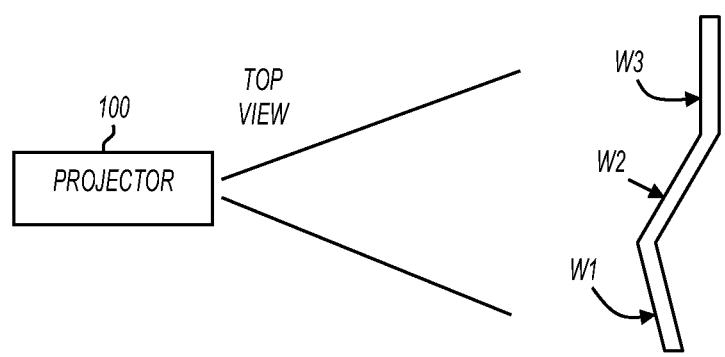

FIGS. 17 and 18 show top views of scanning laser projectors projecting onto complex projection surfaces in accordance with various embodiments of the present invention. FIG. 17 shows three objects presenting four surfaces (S1, S2, S3, S4) upon which projection points will fall. FIG. 18 shows a wall with three separate surfaces (W1, W2, W3) upon which projection points will fall.

Various embodiments of the present invention acquire an irregular surface such as those shown in FIGS. 17 and 18 to use as a "reference shape". For example, an inanimate irregular (x,y,z) 3D shaped surface may be measured using the proximity sensor and the corresponding projection point data may be saved in device memory. Subsequent projection point measurement samples are then compared against the saved reference shape points to determine whether any of the newly measured projection points deviate from the reference. In these embodiments, equations are not calculated but a tolerance from the established "reference shape" is still specified. If a projection point deviates from the "reference shape" by an amount greater than the tolerance, an intrusion into the projection field is indicated.

Figure 19:
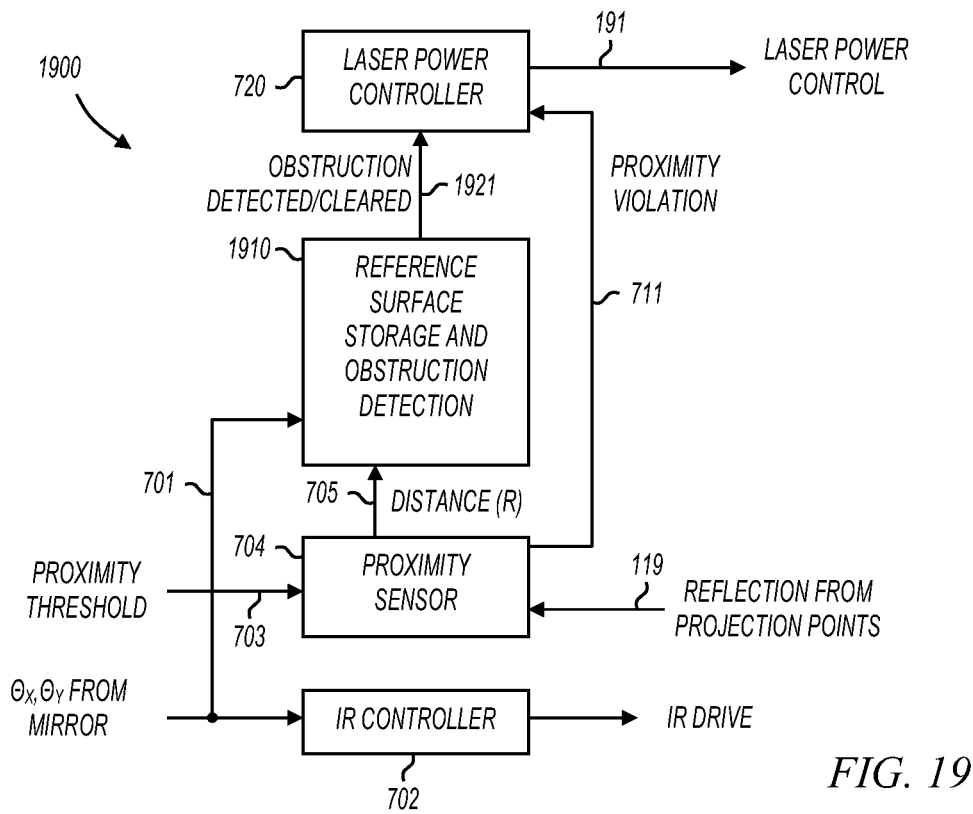
FIG. 19 shows a laser safety module in accordance with various embodiments of the present invention.

FIG. 19 shows a laser safety module in accordance with various embodiments of the present invention. Laser safety module 1900 is an example implementation of laser safety module 190 (FIG. 1). Laser safety module 1900 is similar to laser safety module 700 (FIG. 7) with the exception of reference surface storage and obstruction detection circuit 1910.

In operation, reference surface storage and obstruction detection circuit 1910 stores information describing a reference surface, and determines if an obstruction is present by comparing the locations of projection points to the stored reference surface. In some embodiments, the stored reference surface is represented mathematically, and in other embodiments, the stored reference surface is a stored set of projection points.

If reference surface storage and obstruction detection circuit detects that an obstruction is present or that an obstruction has been cleared, this information is provided to laser power controller 720. Laser power controller 720 may then adjust laser power output as described above.

Figure 20:
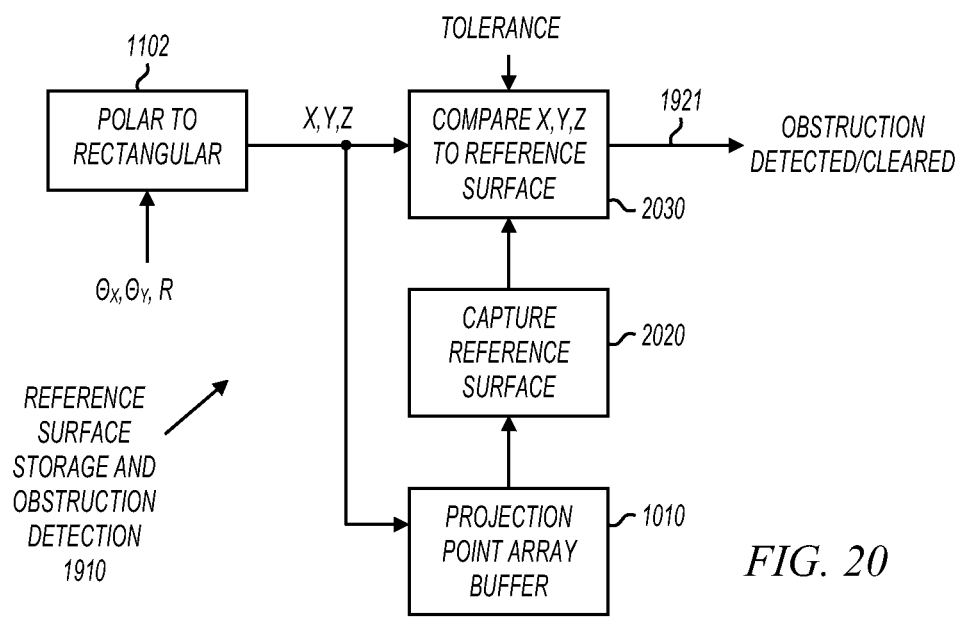
FIG. 20 shows a reference surface storage and obstruction detector in accordance with various embodiments of the present invention.

FIG. 20 shows a reference surface storage and obstruction detector in accordance with various embodiments of the present invention. Circuit 1910 includes polar-to-rectangular conversion circuit 1102, projection point array buffer 1010, reference surface capture circuit 2020, and comparator 2030. In operation, each projection point is received by circuit 1910 as a point in 3D space represented by polar coordinates $\Theta_X$, $\Theta_Y$, R, where $\Theta_X$, $\Theta_Y$ represent the mirror angle, and R represents the radius. Polar-to-rectangular conversion circuit 1102 receives the projection points in polar coordinates $\Theta_X$, $\Theta_Y$, R, and converts them to rectangular coordinates X,Y,Z. Polar-to-rectangular conversion circuit 1102 may be implemented in any suitable manner. For example, in some embodiments, polar-to-rectangular conversion circuit 1102 is implemented in digital hardware, and in other embodiments, polar-to-rectangular conversion circuit is implemented by a processor that executes instructions stored in a memory device.

Projection point array buffer 1010 stores the data that represents the projection points in 3D space. In some embodiments, the data in projection points array buffer 1010 is replaced for each frame of projection points, and in other embodiments, the data in projection points array buffer 1010 is averaged over a number of frames to reduce noise. Projection point array buffer 1010 may be implemented in any suitable manner. For example, in some embodiments, projection points array buffer 1010 is implemented using a memory device such as a static random access memory (SRAM).

Reference surface capture circuit 2020 captures a representation of the projection surface as identified by the projection point data in buffer 1010. In some embodiments, this is performed once at system startup, and in other embodiments, this is performed periodically throughout an operating period. In some embodiments, the reference surface is represented mathematically, and in other embodiments, the reference surface is represented by a reference projection point array.

Reference surface capture circuit 2020 may be implemented in any suitable manner. For example, in some embodiments, reference surface capture circuit 2020 is implemented in dedicated digital hardware controlled by one or more state machines. In these embodiments, the digital hardware and state machines may be included in an application specific integrated circuit (ASIC). In other embodiments, reference surface capture circuit 2020 may be implemented with a processor that executes instructions stored in a memory.

Comparator 2030 compares the tolerance value to the difference between each Z coordinate value and the reference surface captured by circuit 2020. If all Z coordinate values differ from the reference surface by less than the tolerance, the projection points are determined to lie substantially on the reference surface, and the obstruction cleared signal is asserted at 1921.

Figure 21:
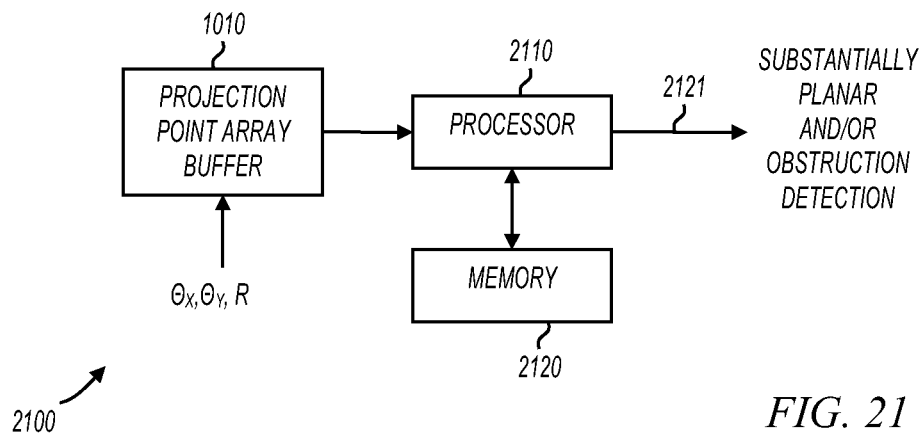
FIG. 21 shows a processor circuit in accordance with various embodiments of the present invention.

FIG. 21 shows a processor circuit in accordance with various embodiments of the present invention. In some embodiments, processor circuit 2100 may be used as planarity detector 710 in laser safety module 700 as described above. In other embodiments, processor circuit 2100 may be used as reference surface storage and obstruction detection circuit 1910 in laser safety module 1900 as described above. Processor circuit 2100 includes projection point array buffer 1010, processor 2110, and memory 2120. Memory 2120 represents a non-transitory computer-readable medium that stores instructions. When the instructions are executed by processor 2110, a planarity determination or reference surface operation is performed. Any of the planarity detection or reference surface techniques described above may be performed by processor circuit 2100. For example, processor circuit 2100 may average distances in either polar or rectangular coordinates, determine best fit plane equations, or the like. Also for example, processor circuit 2100 may capture a reference surface either mathematically or by storing projection points. Processor circuit 2100 may also perform comparisons with the projection points to determine whether the projection points lie substantially in a plane or substantially on a reference surface.

Some embodiments of processor circuit 2100 perform planarity determinations without determining average distances or best fit plane equations. For example, some embodiments determine gradient vectors between a subset of adjacent projection points and then determine whether the remaining projection points satisfy the gradient vectors. One such embodiment is described below.

The projection point array buffer 1010 is filled with projection points using any of the method described above. Determine the minimum depth reading Zmin(closest point).

Depending on the edge or corner where Zmin occurs, look for the nearest forward or backward neighbors. Compute the gradient vector as the delta difference Zdelta=Znext−Zcurrent. If Zdelta is greater than or nearly equal to zero, there is increasing gradient in the image plane. Repeat from each new location, until the farthest end from the Zmin. This is a sliding window depth checking algorithm. The sliding window checks current point with nearest neighbors and the direction of sliding is from outward (forward of backward) from the Zmin.

If there is any discontinuity, i.e. if Zdelta is less than zero, that is indicative of a drop in depth or the presence of an obstruction out-of-plane of the expected keystoned image plane.

Figure 22:
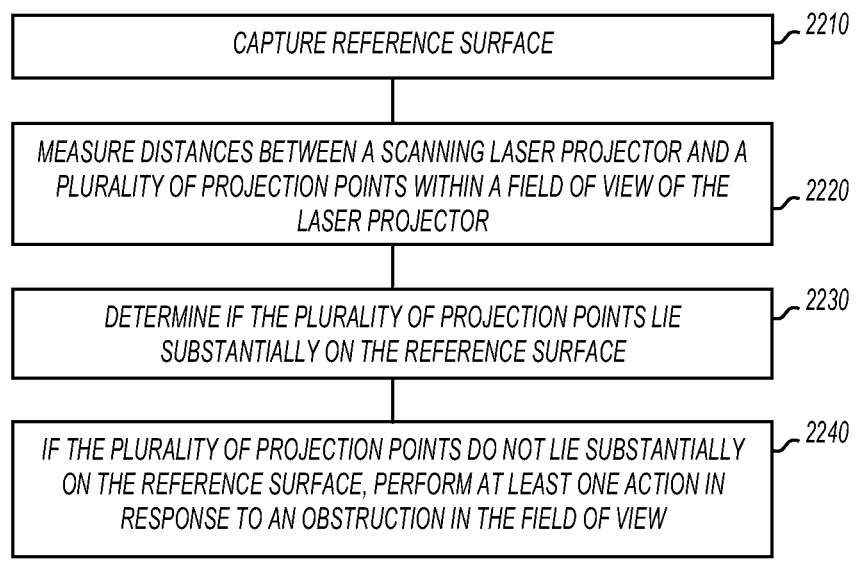
FIG. 22 shows a flowchart of methods in accordance with various embodiments of the present invention.

FIG. 22 shows a flowchart of methods in accordance with various embodiments of the present invention. In some embodiments, method 2200, or portions thereof, is performed by a scanning laser projector with reference surface storage and obstruction detection, embodiments of which are shown in previous figures. In other embodiments, method 2200 is performed by a series of circuits or an electronic system. Method 2200 is not limited by the particular type of apparatus performing the method. The various actions in method 2200 may be performed in the order presented, or may be performed in a different order. Further, in some embodiments, some actions listed in FIG. 22 are omitted from method 2200.

Method 2200 is shown beginning with block 2210. As shown at 2210, a reference surface is captured. In some embodiments, this corresponds to a storing a mathematical representation of projection surface. In other embodiments, this corresponds to storing a set of projection points.

At 2220, distances between a scanning laser projector and a plurality of projection points within a field of view of the projector are measured. This corresponds to the operation of proximity sensor 704 (FIG. 19) measuring the round-trip transit time of reflections received at 119.

At 2230, a determination is made whether the plurality of projection points lie substantially on the reference surface. In some embodiments, this is performed by determining whether or not projection points lie on a mathematically defined surface. In other embodiments, this is performed by comparing projection points with stored projection points that represent the reference surface.

At 2240, at least one action is performed to satisfy the requirements of the system or product instantiation with the obstruction in the field of view if the plurality of projection points do not lie substantially on the reference surface. In some embodiments, this corresponds to reducing laser power. In other embodiments, this corresponds to not increasing laser power. In still further embodiments, this corresponds to measuring heat in the field of view to determine if an obstruction exists that could be an animate object such as a human or animal. In still other embodiments, this might set a flag in a higher order or associated computing entity in the system to then cause it take action through a decision matrix.

Figure 23:
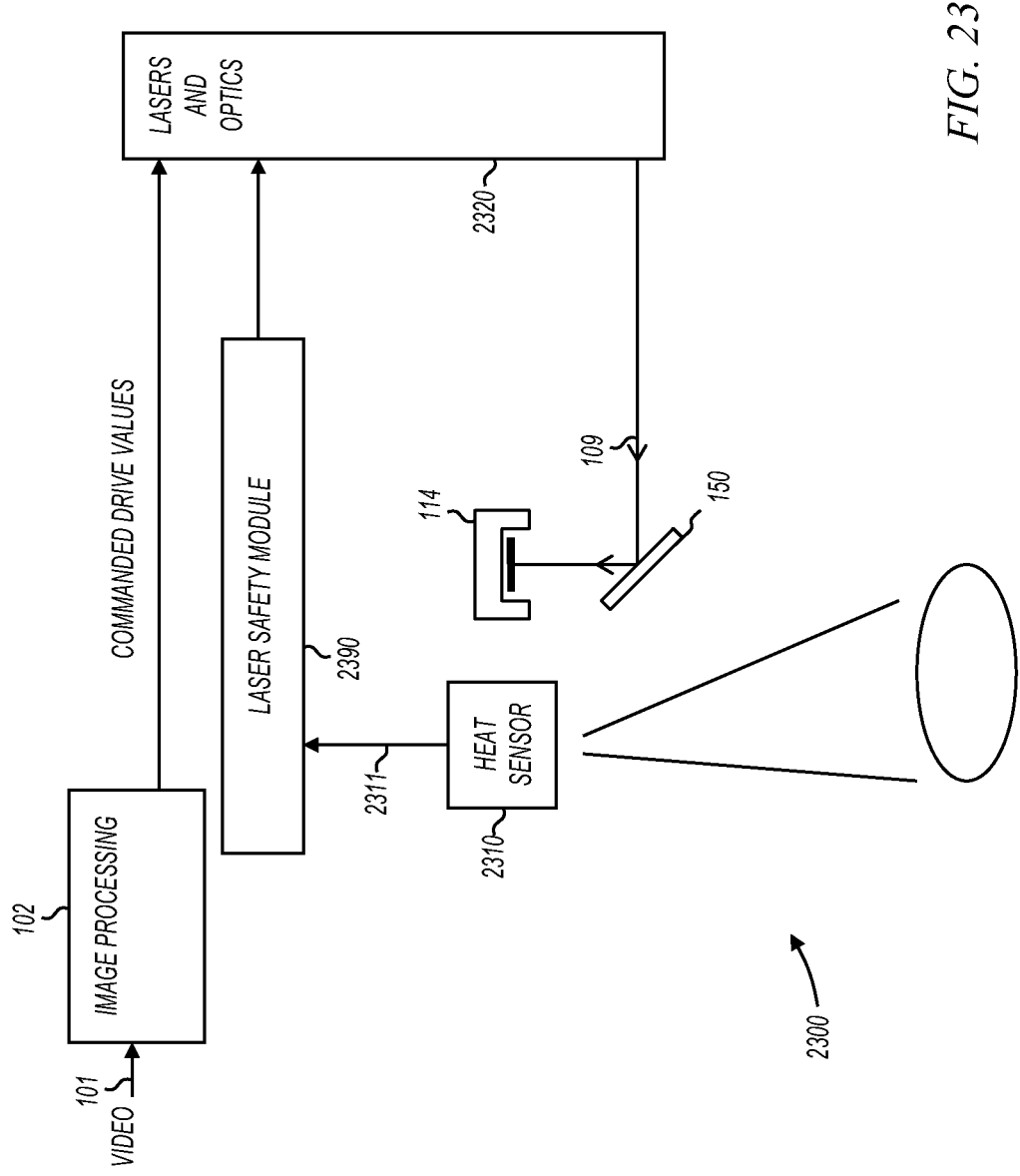
FIG. 23 shows a scanning laser projector with a heat sensor in accordance with various embodiments of the present invention.

FIG. 23 shows a scanning laser projector with a heat sensor in accordance with various embodiments of the present invention. Scanning laser projector 2300 includes similar components as scanning laser projector 100 with the addition of heat sensor 2310. Lasers and Optics 2320 include the laser light modules and optics shown in FIG. 1. Laser safety module 2390 may also include additional components responsive to heat sensor 2310. Laser safety module 2390 is described in more detail below with reference to FIG. 24.

Heat sensor 2310 is any sensor that can sense heat in the field of view of projector 2300. For example, heat sensor 2310 may be a thermopile with a multifaceted optic (e.g., micro Fresnel lens or microlens array) designed and positioned so as to nearly match or overlap the field of view of the projector in order to detect radiation from a thermal body.

A low frequency temperature readout can serve to validate whether an animate object is present in the field of view. For example, in some embodiments, a proximity violation occurs when a user intentionally positions the projector such that an inanimate object (e.g., a book, vase, or other tabletop object) is in the field of view closer than the proximity threshold. The laser power may be turned down as a result of the proximity violation, and will not be turned back up because the planarity or reference surface detection will fail. Heat sensor 2310 may then be utilized to detect if a thermal signature exists within the field of view. If the thermal signature does not match that of an animate object, the laser power can be turned back up. If, on the other hand, a thermal signature suggests that an animate object is causing the proximity violation, then the laser power may remain reduced or off until the obstruction is no longer present.

Figure 24:
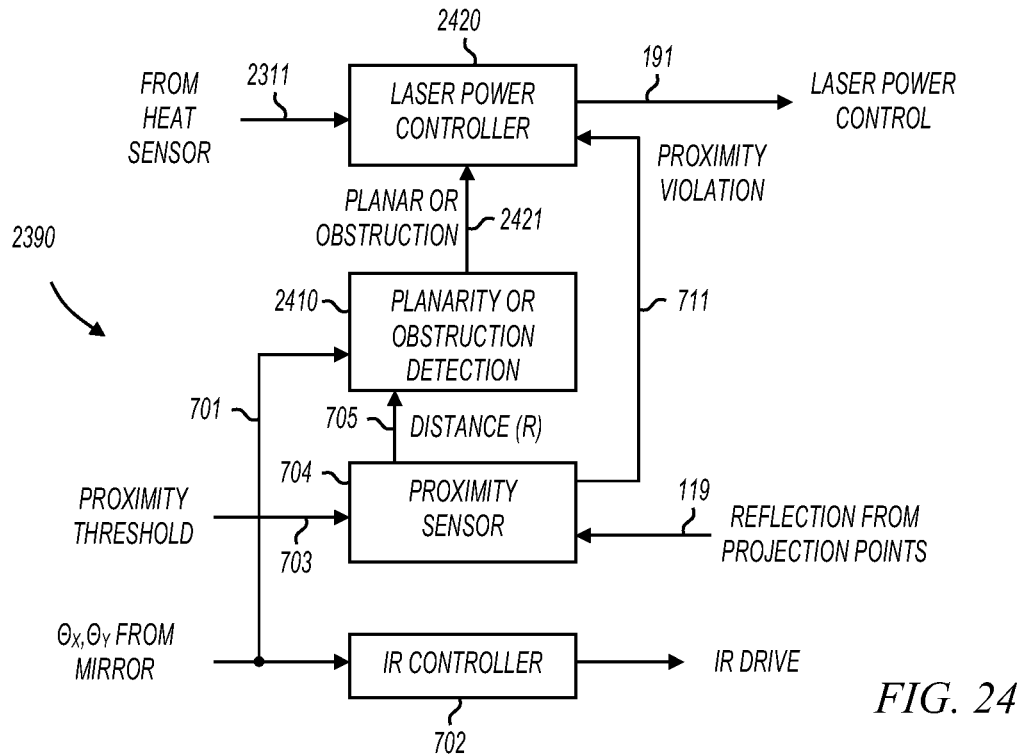
FIG. 24 shows a laser safety module responsive to a heat sensor in accordance with various embodiments of the present invention.

FIG. 24 shows a laser safety module responsive to a heat sensor in accordance with various embodiments of the present invention. Laser safety module 2390 includes proximity sensor 704 and IR controller 702, both of which are described above with reference to FIG. 7. Laser safety module 2390 also includes planarity or obstruction detector 2410 and laser power controller 2420.

Planarity or obstruction detector 2410 may include any of the planarity detection embodiments described herein. Planarity of obstruction detector 2410 may also include any of the reference storage and obstruction detectors described herein.

Laser power controller 2420 is responsive to proximity violations at 711, planarity or obstructions determinations at 2421, and also heat signature information received from a heat sensor at 2311.

In operation, laser safety module turns down laser power when a proximity violation is detected. If the projection points are determined to lie substantially in a plane or to lie substantially on a reference surface, then laser power can be turned back up. If the projection points do not lie substantially in a plane or do not lie substantially on a reference surface, then if the heat sensor indicates there is no animate object in the field of view, laser power can be turned back up. Otherwise, laser power remains reduced until either the heat sensor indicates there is no animate object in the field of view, the projection points are determined to lie either substantially in a plane or on a reference surface, or the proximity violation is removed.

Figure 25:
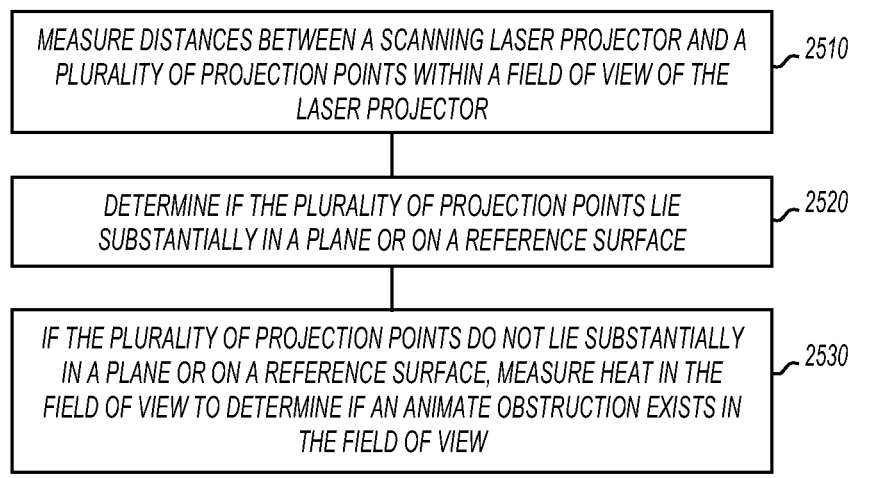
FIG. 25 shows a flowchart of methods in accordance with various embodiments of the present invention.

FIG. 25 shows a flow diagram of methods in accordance with various embodiments of the present invention. In some embodiments, method 2500, or portions thereof, is performed by a scanning laser projector with a heat sensor, embodiments of which are shown in previous figures. In other embodiments, method 2500 is performed by a series of circuits or an electronic system. Method 2500 is not limited by the particular type of apparatus performing the method. The various actions in method 2500 may be performed in the order presented, or may be performed in a different order. Further, in some embodiments, some actions listed in FIG. 25 are omitted from method 2500.

Method 2500 is shown beginning with block 2510. As shown at 2510, distances between a scanning laser projector and a plurality of projection points within a field of view of the projector are measured. This corresponds to the operation of proximity sensor 704 (FIG. 24) measuring the round-trip transit time of reflections received at 119.

At 2520, a determination is made whether the plurality of projection points lie substantially in a plane or on a reference surface. In some embodiments, this is performed by fitting the projection points to a best fit plane equation in 3D space.

In other embodiments, this is performed by determining an average distance, and then comparing the distance to each projection point against the average. In still further embodiments, this is performed by determining an average gradient vector between adjacent projection points and then determining if any one projection point does not lie within the expected space. And in still further embodiments this is performed by comparing projection points against a stored reference surface.

At 2530, heat is measured in the field of view to determine if an animate obstruction exists in the field of view. In some embodiments, this is only performed if the plurality of projection points do not lie substantially in a plane or on a reference surface, and in other embodiments, this is performed without regard to the planarity or reference surface determination. As described above, laser power control may be influenced based on the results of the heat sensing performed at 2530. If a heat signature is detected that suggests an animate object is in the field of view, then laser power may remain reduced. If a heat signature is detected that suggests that no animate object is in the field of view, then laser power may be restored to a higher level.

Figure 26:
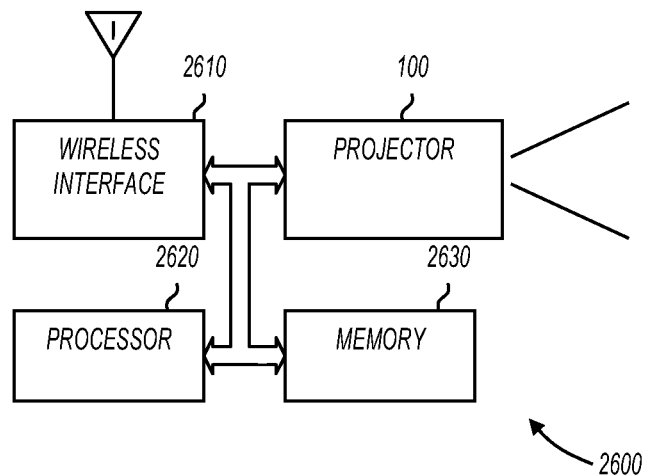
FIG. 26 shows a block diagram of a mobile device in accordance with various embodiments of the present invention.

FIG. 26 shows a block diagram of a mobile device in accordance with various embodiments of the present invention. As shown in FIG. 26, mobile device 2600 includes wireless interface 2610, processor 2620, memory 2630, and scanning laser projector 100. Scanning laser projector 100 includes laser safety circuits and power control as described above. For example, scanning laser projector 100 may include a proximity sensor and a planarity detector or reference surface storage and obstruction detection. Also for example, scanning laser projector 100 may include a heat sensor to determine if an obstruction in the field of view is animate or inanimate as described herein.

Scanning laser projector 100 may receive image data from any image source. For example, in some embodiments, scanning laser projector 100 includes memory that holds still images. In other embodiments, scanning laser projector 100 includes memory that includes video images. In still further embodiments, scanning laser projector 100 displays imagery received from external sources such as connectors, wireless interface 2610, a wired interface, or the like.

Wireless interface 2610 may include any wireless transmission and/or reception capabilities. For example, in some embodiments, wireless interface 2610 includes a network interface card (NIC) capable of communicating over a wireless network. Also for example, in some embodiments, wireless interface 2610 may include cellular telephone capabilities. In still further embodiments, wireless interface 2610 may include a global positioning system (GPS) receiver. One skilled in the art will understand that wireless interface 2610 may include any type of wireless communications capability without departing from the scope of the present invention.

Processor 2620 may be any type of processor capable of communicating with the various components in mobile device 2600. For example, processor 2620 may be an embedded processor available from application specific integrated circuit (ASIC) vendors, or may be a commercially available microprocessor. In some embodiments, processor 2620 provides image or video data to scanning laser projector 100. The image or video data may be retrieved from wireless interface 2610 or may be derived from data retrieved from wireless interface 2610. For example, through processor 2620, scanning laser projector 100 may display images or video received directly from wireless interface 2610. Also for example, processor 2620 may provide overlays to add to images and/or video received from wireless interface 2610, or may alter stored imagery based on data received from wireless interface 2610 (e.g., modifying a map display in GPS embodiments in which wireless interface 2610 provides location coordinates).

Figure 27:
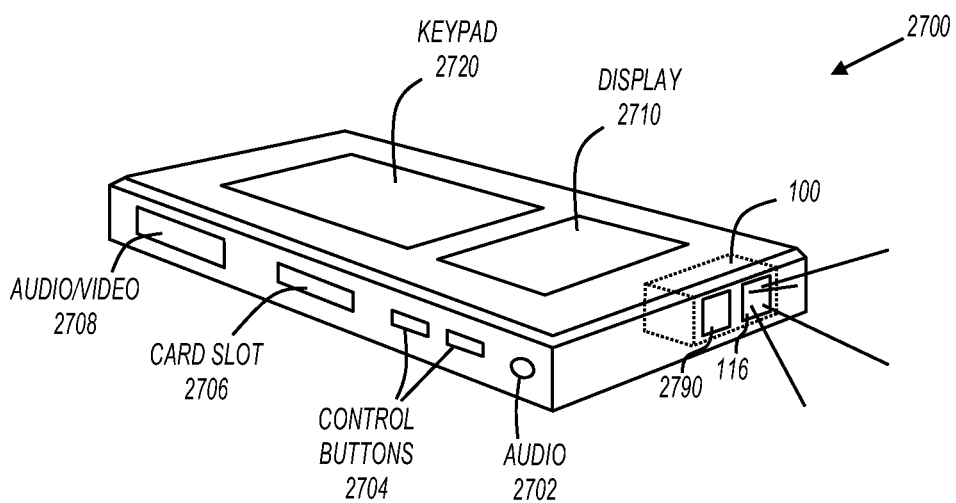
FIG. 27 shows a mobile device in accordance with various embodiments of the present invention.

FIG. 27 shows a mobile device in accordance with various embodiments of the present invention. Mobile device 2700 may be a hand held scanning laser projector with or without communications ability. For example, in some embodiments, mobile device 2700 may be a scanning laser projector with little or no other capabilities. Also for example, in some embodiments, mobile device 2700 may be a device usable for communications, including for example, a cellular phone, a smart phone, a tablet computing device, a global positioning system (GPS) receiver, or the like. Further, mobile device 2700 may be connected to a larger network via a wireless (e.g., cellular), or this device can accept and/or transmit data messages or video content via an unregulated spectrum (e.g., WiFi) connection.

Mobile device 2700 includes scanning laser projector 100, display 2710, keypad 2720, audio port 2702, control buttons 2704, card slot 2706, and audio/video (A/V) port 2708. None of these elements are essential. For example, mobile device 2700 may only include scanning laser projector 100 without any of display 2710, keypad 2720, audio port 2702, control buttons 2704, card slot 2706, or A/V port 2708. Some embodiments include a subset of these elements. For example, an accessory projector may include scanning laser projector 100, control buttons 2704 and A/V port 2708. A smartphone embodiment may combine keypad 2720 and display 2710 into a touch sensitive display device.

Display 2710 may be any type of display. For example, in some embodiments, display 2710 includes a liquid crystal display (LCD) screen. In some embodiments, display 2710 is touch sensitive. Display 2710 may or may not always display the image projected by scanning laser projector 100. For example, an accessory product may always display the projected image on display 2710, whereas a mobile phone embodiment may project a video while displaying different content on display 2710. Keypad 2720 may be a phone keypad or any other type of keypad.

A/V port 2708 accepts and/or transmits video and/or audio signals. For example, A/V port 2708 may be a digital port, such as a high definition multimedia interface (HDMI) interface that accepts a cable suitable to carry digital audio and video data. Further, A/V port 2708 may include RCA jacks to accept or transmit composite inputs. Still further, A/V port 2708 may include a VGA connector to accept or transmit analog video signals. In some embodiments, mobile device 2700 may be tethered to an external signal source through A/V port 2708, and mobile device 2700 may project content accepted through A/V port 2708. In other embodiments, mobile device 2700 may be an originator of content, and A/V port 2708 is used to transmit content to a different device.

Audio port 2702 provides audio signals. For example, in some embodiments, mobile device 2700 is a media recorder that can record and play audio and video. In these embodiments, the video may be projected by scanning laser projector 100 and the audio may be output at audio port 2702.

Mobile device 2700 also includes card slot 2706. In some embodiments, a memory card inserted in card slot 2706 may provide a source for audio to be output at audio port 2702 and/or video data to be projected by scanning laser projector 100. Card slot 2706 may receive any type of solid state memory device, including for example secure digital (SD) memory cards.

Figure 28:
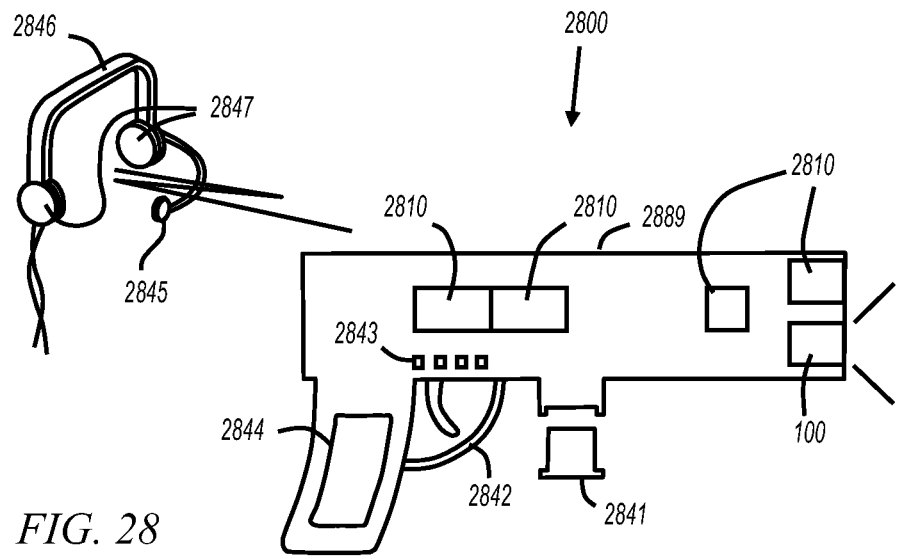
FIGS. 28 and 29 show gaming apparatus in accordance with various embodiments of the present invention.

FIG. 28 shows a gaming apparatus in accordance with various embodiments of the present invention. Gaming apparatus 2800 allows a user or users to observe and interact with a gaming environment. In some embodiments, the game is navigated based on the motion, position, or orientation of gaming apparatus 2800, an apparatus that includes scanning laser projector 100.

Other control interfaces, such as manually-operated buttons, foot pedals, or verbal commands, may also contribute to navigation around, or interaction with the gaming environment. For example, in some embodiments, trigger 2842 contributes to the illusion that the user or users are in a first person perspective video game environment, commonly known as a "first person shooter game." Because the size and brightness of the projected display can be controlled by the gaming application in combination with the user's movement, gaming apparatus 2800 creates a highly believable or "immersive" environment for these users.

Many other first person perspective simulations can also be created by gaming apparatus 2800, for such activities as 3D seismic geo-prospecting, spacewalk planning, jungle canopy exploration, automobile safety instruction, medical education, etc. Tactile interface 2844 may provide a variety of output signals, such as recoil, vibration, shake, rumble, etc. Tactile interface 2844 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 2800 may also include audio output devices, such as integrated audio speakers, remote speakers, or headphones. These sorts of audio output devices may be connected to gaming apparatus 2800 with wires or through a wireless technology. For example, wireless headphones 2846 provide the user with sound effects via a Bluetooth connection, although any sort of similar wireless technology could be substituted freely. In some embodiments, wireless headphones 2846 may include microphone 2845 or binaural microphone 2847, to allow multiple users, instructors, or observers to communicate. Binaural microphone 2847 typically includes microphones on each ear piece, to capture sounds modified by the user's head shadow. This feature may be used for binaural hearing and sound localization by other simulation participants.

Gaming apparatus 2800 may include any number of sensors 2810 that measure ambient brightness, motion, position, orientation, and the like. For example, gaming apparatus 2800 may detect absolute heading with a digital compass, and detect relative motion with an x-y-z gyroscope or accelerometer. In some embodiments, gaming apparatus 2800 also includes a second accelerometer or gyroscope to detect the relative orientation of the device, or its rapid acceleration or deceleration. In other embodiments, gaming apparatus 2800 may include a Global Positioning Satellite (GPS) sensor, to detect absolute position as the user travels in terrestrial space.

Gaming apparatus 2800 may include battery 2841 and/or diagnostic lights 2843. For example, battery 2841 may be a rechargeable battery, and diagnostic lights 2843 could indicate the current charge of the battery. In another example, battery 2841 may be a removable battery clip, and gaming apparatus 2800 may have an additional battery, electrical capacitor or super-capacitor to allow for continued operation of the apparatus while the discharged battery is replaced with a charged battery. In other embodiments, diagnostic lights 2843 can inform the user or a service technician about the status of the electronic components included within or connected to this device. For example, diagnostic lights 2843 may indicate the strength of a received wireless signal, or the presence or absence of a memory card. Diagnostic lights 2843 could also be replaced by any small screen, such as an organic light emitting diode or liquid crystal display screen. Such lights or screens could be on the exterior surface of gaming apparatus 2800, or below the surface, if the shell for this apparatus is translucent or transparent.

Other components of gaming apparatus 2800 may be removable, detachable or separable from this device. For example, scanning laser projector 100 may be detachable or separable from gaming housing 2849. In some embodiments, the subcomponents of scanning laser projector 100 may be detachable or separable from gaming housing 2849, and still function.

Figure 29:
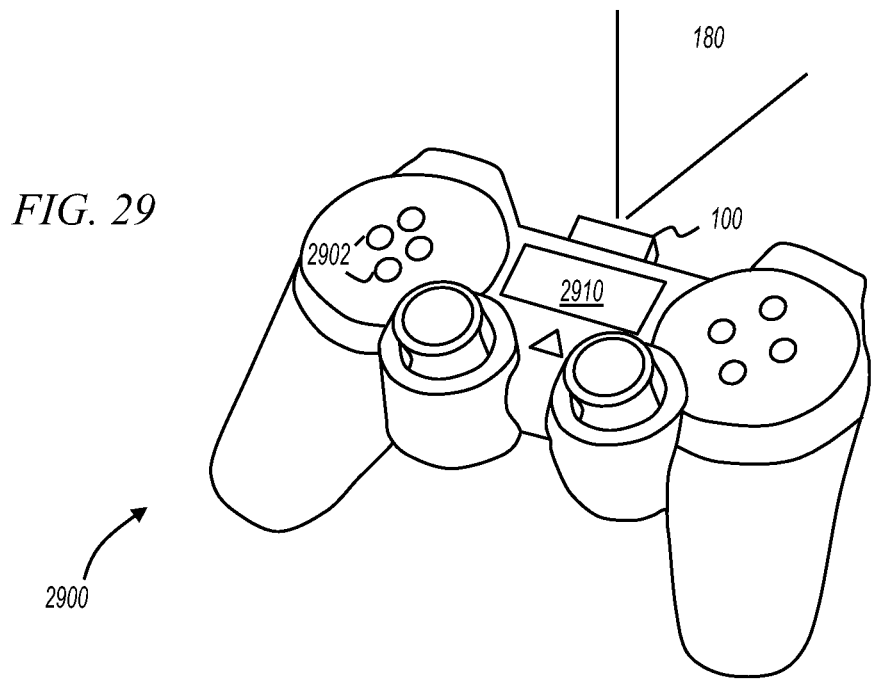

FIG. 29 shows a gaming apparatus in accordance with various embodiments of the present invention. Gaming apparatus 2900 includes buttons 2902, display 2910, and projector 100. In some embodiments, gaming apparatus 2900 is a standalone apparatus that does not need a larger console for a user to play a game. For example, a user may play a game while watching display 2910 and/or the projected content at 180. In other embodiments, gaming apparatus 2900 operates as a controller for a larger gaming console. In these embodiments, a user may watch a larger screen tethered to the console in combination with watching display 2910 and/or projected content at 180.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
    determining that at least one projection point in a field of view of a scanning laser projector violates a proximity threshold;
    reducing laser power within the scanning laser projector;
    measuring distances between the scanning laser projector and a plurality of projection points within the field of view;
    determining if the plurality of projection points lie substantially in a plane;
    if the plurality of projection points lie substantially in a plane, increasing the laser power; and
    if the plurality of projection points do not lie substantially in a plane, measuring heat in the field of view to determine if an animate obstruction exists in the field of view.

2. The method of claim 1 further comprising increasing the laser power if an animate obstruction does not exist in the field of view.

3. A method comprising:
    determining that at least one projection point in a field of view of a scanning laser projector violates a proximity threshold;
    reducing laser power within the scanning laser projector;
    measuring distances between the scanning laser projector and a plurality of projection points within the field of view;
    determining if the plurality of projection points lie substantially in a plane, wherein determining if the plurality of projection points lie substantially in a plane comprises determining gradient vectors between projection points; and if the plurality of projection points lie substantially in a plane, increasing the laser power.

4. An apparatus comprising:
a laser light source;
a scanning mirror to reflect light from the laser light source in a raster pattern in a field of view;
a proximity sensor that measures distances between the scanning mirror and objects in the field of view;
a planarity detector to determine if projection points corresponding to the distances measured by the proximity sensor lie substantially in a plane;
a laser power controller that controls output power of the laser light source in response to signals from both the proximity sensor and the planarity detector, wherein the laser power controller reduces laser power immediately upon receiving an indication of a proximity violation from the proximity sensor and wherein the laser power controller reverses a laser power reduction upon receiving an indication of planarity from the planarity detector; and
a heat sensing device to sense heat in the field of view and provide a signal to the laser power controller.

5. An apparatus comprising:
a laser light source;
a scanning mirror to reflect light from the laser light source in a raster pattern in a field of view;
a proximity sensor that measures distances between the scanning mirror and objects in the field of view;
a planarity detector to determine if projection points corresponding to the distances measured by the proximity sensor lie substantially in a plane; and
a laser power controller that controls output power of the laser light source in response to signals from both the proximity sensor and the planarity detector, wherein the laser power controller reduces laser power immediately upon receiving an indication of a proximity violation from the proximity sensor and wherein the laser power controller reverses a laser power reduction upon receiving an indication of planarity from the planarity detector, wherein the planarity detector determines if the projection points lie substantially in a plane by determining gradient vectors between projection points.

6. A method comprising:
measuring distances between a scanning laser projector and a plurality of projection points in a field of view of the scanning laser projector;
determining if the plurality of projection points lie substantially on a non-planar reference surface; and
if the plurality of projection points do not lie substantially on the non-planar reference surface, performing at least one action to change operation of the scanning laser projector in response to an obstruction in the field of view.

7. The method of claim 6 wherein the non-planar reference surface is specified mathematically.

8. The method of claim 6 wherein the non-planar reference surface is specified by a set of projection points measured by a proximity detector and stored as the non-planar reference surface.

9. The method of claim 6 further comprising determining and storing the non-planar reference surface.

10. The method of claim 9 wherein the determining if the plurality of projection points lie substantially on the non-planar reference surface comprises comparing measured distances to the stored non-planar reference surface.

11. An apparatus comprising:
a laser light source;
a scanning mirror to reflect light from the laser light source in a raster pattern in a field of view;
a proximity sensor that measures distances between the scanning mirror and objects in the field of view;
a reference surface detector configured to determine a non-planar reference surface based on the measured distances and store information describing the non-planar reference surface; and
an obstruction detection circuit configured to determine if a plurality of projection points do not lie on the non-planar reference surface; and
a laser power controller that controls output power of the laser light source in response to signals from both the proximity sensor and the obstruction detection circuit.

12. The apparatus of claim 11 wherein the laser power controller reduces laser power immediately upon receiving an obstruction from the obstruction detection circuit.

13. The apparatus of claim 11 wherein the reference surface detector is further configured to store non-planar reference surface.

14. The apparatus of claim 13 wherein the obstruction detection circuit is configured to compare the plurality of projection points to the stored non-planar reference surface to determine if a plurality of projection points do not lie on the non-planar reference surface.

15. The apparatus of claim 11 further comprising a heat sensing device to sense heat in the field of view and provide a signal to the laser power controller.

16. A method comprising:
measuring distances between a scanning laser projector and a plurality of projection points in a field of view of the scanning laser projector;
determining if a gradient vector between two of the plurality of projection points is beyond a threshold; and
if the gradient vector between the two of the plurality of projection points is beyond the threshold, performing at least one action to change operation of the scanning laser projector in response to an obstruction in the field of view.

17. The method of claim 16, wherein the step of determining if the gradient vector between the two of the plurality of projection points is beyond the threshold comprises:
assigning a depth Zcurrent for a current projection point;
determining a depth Znext for a next projection point; and
determining a delta difference Zdelta as difference between Znext and Zcurrent.

18. The method of claim 17 wherein the current projection point and the next projection point are adjacent projection points in the field of view of the scanning laser projector.

19. The method of claim 16 wherein the step of determining if the gradient vector between the two of the plurality of projection points is beyond the threshold comprises starting at a projection point having a certain depth reading and comparing to neighboring projection points in a sliding window.

20. The method of claim 19 wherein the step of determining if the gradient vector between the two of the plurality of projection points is beyond the threshold further comprises the determining if the gradient vector between the two of the plurality of projection points has a slope less than zero.

21. An apparatus comprising:
a laser light source;

a scanning mirror to reflect light from the laser light source in a raster pattern in a field of view;

a proximity sensor that measures distances between the scanning mirror and objects in the field of view;

an obstruction detection circuit configured to determine if a gradient vector between two of the plurality of projection points is beyond a threshold; and a laser power controller that controls output power of the laser light source in response to signals from both the proximity sensor and the obstruction detection circuit.

22. The apparatus of claim 21 wherein the laser power controller reduces laser power immediately upon receiving an obstruction from the obstruction detection circuit.

23. The apparatus of claim 21 wherein the obstruction detection circuit is configured to determine if the gradient vector between the two of the plurality of projection points is beyond the threshold by:

assigning a depth Zcurrent for a current projection point;

determining a depth Znext for a next projection point; and determining a delta difference Zdelta as difference between Znext and Zcurrent.

24. The apparatus of claim 23 wherein the current projection point and the next projection point are adjacent projection points in the field of view of the scanning laser projector.

25. The apparatus of claim 21 wherein the obstruction detection circuit is configured to determine if the gradient vector between the two of the plurality of projection points is beyond the threshold by starting at a projection point having a certain depth reading and comparing to neighboring projection points in a sliding window.

26. The apparatus of claim 25 wherein the obstruction detection circuit is configured to determine if the gradient vector between the two of the plurality of projection points is beyond the threshold by determining if the gradient vector between the two of the plurality of projection points has a slope less than zero.

* * * * *